US012666080B2

(12) United States Patent
Choi et al.

(10) Patent No.: US 12,666,080 B2
(45) Date of Patent: Jun. 23, 2026

(54) IMAGE DECODING METHOD AND DEVICE

(71) Applicant: LG Electronics Inc., Seoul (KR)

(72) Inventors: Jungah Choi, Seoul (KR); Sunmi Yoo, Seoul (KR); Jaehyun Lim, Seoul (KR); Jangwon Choi, Seoul (KR); Seunghwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/850,258

(22) PCT Filed: Jan. 19, 2023

(86) PCT No.: PCT/KR2023/000920
§ 371 (c)(1),
(2) Date: Sep. 24, 2024

(87) PCT Pub. No.: WO2023/182634
PCT Pub. Date: Sep. 28, 2023

(65) Prior Publication Data
US 2025/0220238 A1 Jul. 3, 2025

Related U.S. Application Data

(60) Provisional application No. 63/328,750, filed on Apr. 8, 2022, provisional application No. 63/323,086, filed on Mar. 24, 2022.

(51) Int. Cl.
*H04N 19/61* (2014.01)
*H04N 19/122* (2014.01)
(Continued)

(52) U.S. Cl.
CPC ........... *H04N 19/61* (2014.11); *H04N 19/122* (2014.11); *H04N 19/167* (2014.11); *H04N 19/176* (2014.11)

(58) Field of Classification Search
CPC .... H04N 19/61; H04N 19/122; H04N 19/167; H04N 19/176
See application file for complete search history.

(56) References Cited

U.S. PATENT DOCUMENTS

| | | | |
|---|---|---|---|
| 2018/0176563 A1 | 6/2018 | Zhao et al. | |
| 2019/0208225 A1 | 7/2019 | Chen et al. | |
| 2021/0067807 A1 | 3/2021 | Lainema | |

FOREIGN PATENT DOCUMENTS

| | | | | |
|---|---|---|---|---|
| KR | 10-2020-0112964 A | 10/2020 | | |
| WO | WO-2020141855 A1 * | 7/2020 | ............. | H04N 19/18 |
| WO | 2023/103521 A1 | 6/2023 | | |

OTHER PUBLICATIONS

Chen et al., "EE2-4.3 related: More combined test results for sign prediction," JVET-Y0141-v4, Joint Video Experts Team (JVET) of ITU-T SG 16 WP 3 and ISO/IEC JTC 1/SC 29, 25th Meeting, by teleconference, Jan. 12-21, 2022, 7 pages.

(Continued)

*Primary Examiner* — Justin W Rider
(74) *Attorney, Agent, or Firm* — Fish & Richardson P.C.

(57) ABSTRACT

An image decoding method performed by a decoding device according to the present disclosure comprises the steps of: deriving a predicted number of signs of a current block; performing sign prediction of the current block to derive as many signs of residual coefficients as the predicted number of signs; deriving residual samples of the current block on the basis of the signs; and generating a reconstructed picture on the basis of the residual samples.

14 Claims, 11 Drawing Sheets

Sign prediction area

NxN transform block (a)

Sign prediction area

NxN transform block (b)

(51) Int. Cl.
  *H04N 19/167*       (2014.01)
  *H04N 19/176*       (2014.01)

(56)                References Cited

OTHER PUBLICATIONS

International Search Report and Written Opinion in International Appln. No. PCT/KR2023/000920, mailed on Apr. 21, 2023, 15 pages (with English translation).
Sarwer et al., "AHG12: On sign prediction," JVET-X0120-v2, Joint Video Experts Team (JVET) of ITU-T SG 16 WP 3 and ISO/IEC JTC 1/SC 29, 24th Meeting, by teleconference, Oct. 6-15, 2021, 4 pages.
Chien et al., "Hybrid Video Codec Based on Flexible Block Partitioning With Extensions to the Joint Exploration Model," IEEE Transactions on Circuits and Systems for Video Technology, Nov. 2019, 30(5):1346-1360.
Extended European Search Report in European Appln. No. 23775137.5, mailed on Feb. 12, 2026, 9 pages.

* cited by examiner

◯ (hatched) : Reconstructed neighbor

◯ : Reconstructed sign candidate

Sign prediction area

NxN transform block (a)

Sign prediction area

NxN transform block (b)

(a)                    (b)

(a)

(b)

(a)

(b)

1

IMAGE DECODING METHOD AND DEVICE

CROSS-REFERENCE TO RELATED APPLICATIONS

This application is a National Stage application under 35 U.S.C. § 371 of International Application No. PCT/KR2023/000920, filed on Jan. 19, 2023, which claims the benefit of U.S. Provisional Application No. 63/323,086, filed on Mar. 24, 2022, and U.S. Provisional Application No. 63/328,750, filed on Apr. 8, 2022. The disclosures of the prior applications are incorporated by reference in their entirety.

TECHNICAL FIELD

This document relates to image coding technology, and more specifically, to an image decoding method and device for coding image information by predicting the sign of a transform coefficient in an image coding system.

BACKGROUND

Recently, demand for high-resolution, high-quality video/images such as 4K or 8K or higher UHD (Ultra High Definition) videos/images is increasing in various fields. As video/image data becomes higher resolution and higher quality, the amount of information or bits transmitted increases relative to existing video/image data, when transmitting image data using media such as existing wired or wireless broadband lines or storing video/image data using existing storage media, transmission and storage costs increase.

In addition, interest in and demand for immersive media such as VR (Virtual Reality), AR (Artificial Reality) content and holograms is increasing, broadcasting of videos/images with image characteristics different from real images, such as game images, is increasing.

Accordingly, highly efficient image compression technology is required to effectively compress, transmit, store, and reproduce high-resolution, high-quality video/image information having the various characteristics described above.

SUMMARY

The present disclosure provides a method and apparatus for improving video/image coding efficiency.

Another technical task of this document is to provide a method and device for performing sign prediction for the current block.

Another technical task of this document is to provide a method and device for adaptively deriving the number of signs for sign prediction.

Technical Solution

According to an embodiment of this document, an image decoding method performed by a decoding device is provided. The method comprises deriving the number of prediction signs of the current block, deriving signs of residual coefficients of the number of prediction signs by performing sign prediction on the current block, deriving residual samples of the current block based on the signs, and generating a reconstructed picture based on the residual samples.

According to another embodiment of this document, a decoding device that performs video decoding is provided. The decoding device includes a memory and at least one processor connected to the memory, wherein the at least one processor is configured to derive the number of prediction signs for the current block, perform sign prediction for the current block, derive the signs of the residual coefficients based on the number of prediction signs, derive residual samples of the current block based on the signs, and generate a reconstructed picture based on the residual samples.

According to another embodiment of this document, a video encoding method performed by an encoding device is provided. The method comprises deriving the number of prediction signs for the current block, performing sign prediction for the current block to derive the signs of the residual coefficients based on the number of prediction signs, deriving residual samples of the current block based on the signs, and encoding the image information including residual information of the current block and information on the number of prediction signs.

According to another embodiment of this document, a video encoding device is provided. The encoding device includes a memory and at least one processor connected to the memory, wherein the at least one processor is configured to derive the number of prediction signs for the current block, perform sign prediction for the current block to derive the signs of the residual coefficients based on the number of prediction signs, derive residual samples of the current block based on the signs, and encode the image information including residual information of the current block and information on the number of prediction signs.

According to another embodiment of this document, a digital storage medium is provided. The digital storage medium can store a bitstream that includes the residual information encoded by the video encoding method according to this document and information on the number of prediction signs.

According to another embodiment of this document, a data transmission method for video is provided. The data transmission method comprises acquiring a bitstream of image information that includes information on the number of prediction signs and residual information of the current block, and transmitting the data that includes the bitstream of the image information containing the information on the number of prediction signs and the residual information.

According to another embodiment of this document, a device for data transmission for video is provided. The device includes at least one processor configured to acquire a bitstream of image information that includes information on the number of prediction signs and residual information of the current block, and a transmission unit configured to transmit the data that includes the bitstream of the image information containing the information on the number of prediction signs and the residual information.

According to this document, the number of prediction signs can be adaptively derived based on the last effective coefficient of the current block. This allows the sign prediction accuracy to be improved by reflecting the characteristics of each block in the video, and the coding efficiency can be enhanced by reducing the complexity of sign prediction.

According to this document, the syntax element for the number of prediction signs can be signaled separately for intra slices and inter slices. This allows the sign prediction accuracy to be improved by reflecting the characteristics of the video, and the coding efficiency can be enhanced by reducing the complexity of sign prediction.

According to this document, the syntax element for the number of prediction signs can be signaled separately for luma blocks and chroma blocks. This allows the sign prediction accuracy to be improved by reflecting the characteristics of the video, and the coding efficiency can be enhanced by reducing the complexity of sign prediction.

According to this document, the syntax element for the number of prediction signs can be signaled in the slice header or picture header. This allows the sign prediction accuracy to be improved by reflecting the characteristics of each slice or picture in the video, and the coding efficiency can be enhanced by reducing the complexity of sign prediction.

BRIEF DESCRIPTION OF THE DRAWINGS

FIG. 2 is a schematic diagram illustrating a configuration of a video/image encoding apparatus to which the embodiment(s) of the present disclosure may be applied.

FIG. 3 is a schematic diagram illustrating a configuration of a video/image decoding apparatus to which the embodiment(s) of the present disclosure may be applied.

DETAILED DESCRIPTION

Figure 1:
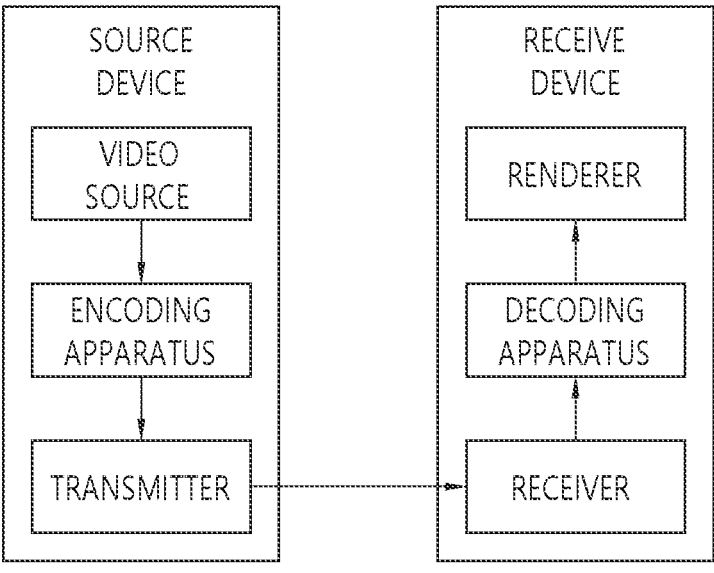
FIG. 1 briefly illustrates an example of a video/image coding device to which embodiments of the present disclosure are applicable.

The present disclosure may be modified in various forms, and specific embodiments thereof will be described and illustrated in the drawings. However, the embodiments are not intended for limiting the disclosure. The terms used in the following description are used to merely describe specific embodiments but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be partitioned into plural elements. The embodiments in which the elements are combined and/or partitioned belong to the disclosure without departing from the concept of the disclosure.

Hereinafter, embodiments of the present disclosure will be described in detail with reference to the accompanying drawings. In addition, like reference numerals may be used to indicate like elements throughout the drawings, and the same descriptions on the like elements will be omitted.

FIG. 1 briefly illustrates an example of a video/image coding device to which embodiments of the present disclosure are applicable.

Referring to FIG. 1, a video/image coding system may include a first device (source device) and a second device (receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input image/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Present disclosure relates to video/image coding. For example, the methods/embodiments disclosed in the present disclosure may be applied to a method disclosed in the versatile video coding (VVC), the EVC (essential video coding) standard, the AOMedia Video 1 (AV1) standard, the 2nd generation of audio video coding standard (AVS2), or the next generation video/image coding standard (ex. H.267 or H.268, etc.).

Present disclosure presents various embodiments of video/image coding, and the embodiments may be performed in combination with each other unless otherwise mentioned.

In the present disclosure, video may refer to a series of images over time. Picture generally refers to a unit representing one image in a specific time zone, and a subpicture/slice/tile is a unit constituting part of a picture in coding. The subpicture/slice/tile may include one or more coding tree units (CTUs). One picture may consist of one or more subpictures/slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. In addition, a subpicture may represent a rectangular region of one or more slices within a picture. That is, a subpicture contains one or more slices that collectively cover a rectangular region of a picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either a number of complete tiles or only a consecutive sequence of complete bricks of one tile. Tile groups and slices may be used interchangeably in the present disclosure. For example, in the present disclosure, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In the present description, "A or B" may mean "only A", "only B" or "both A and B". In other words, in the present specification, "A or B" may be interpreted as "A and/or B". For example, "A, B or C" herein means "only A", "only B", "only C", or "any and any combination of A, B and C".

A slash (/) or a comma (comma) used in the present description may mean "and/or". For example, "A/B" may mean "A and/or B". Accordingly, "A/B" may mean "only A", "only B", or "both A and B". For example, "A, B, C" may mean "A, B, or C".

In the present description, "at least one of A and B" may mean "only A", "only B", or "both A and B". In addition, in the present description, the expression "at least one of A or B" or "at least one of A and/or B" may be interpreted the same as "at least one of A and B".

In addition, in the present description, "at least one of A, B and C" means "only A", "only B", "only C", or "any combination of A, B and C". Also, "at least one of A, B or C" or "at least one of A, B and/or C" may mean "at least one of A, B and C".

In addition, parentheses used in the present description may mean "for example". Specifically, when "prediction (intra prediction)" is indicated, "intra prediction" may be proposed as an example of "prediction". In other words, "prediction" in the present description is not limited to "intra prediction", and "intra prediction" may be proposed as an example of "prediction". Also, even when "prediction (i.e., intra prediction)" is indicated, "intra prediction" may be proposed as an example of "prediction".

In the present description, technical features that are individually described within one drawing may be implemented individually or may be implemented at the same time.

The following drawings were created to explain a specific example of the present description. Since the names of specific devices described in the drawings or the names of specific signals/messages/fields are presented by way of example, the technical features of the present description are not limited to the specific names used in the following drawings.

Figure 2:
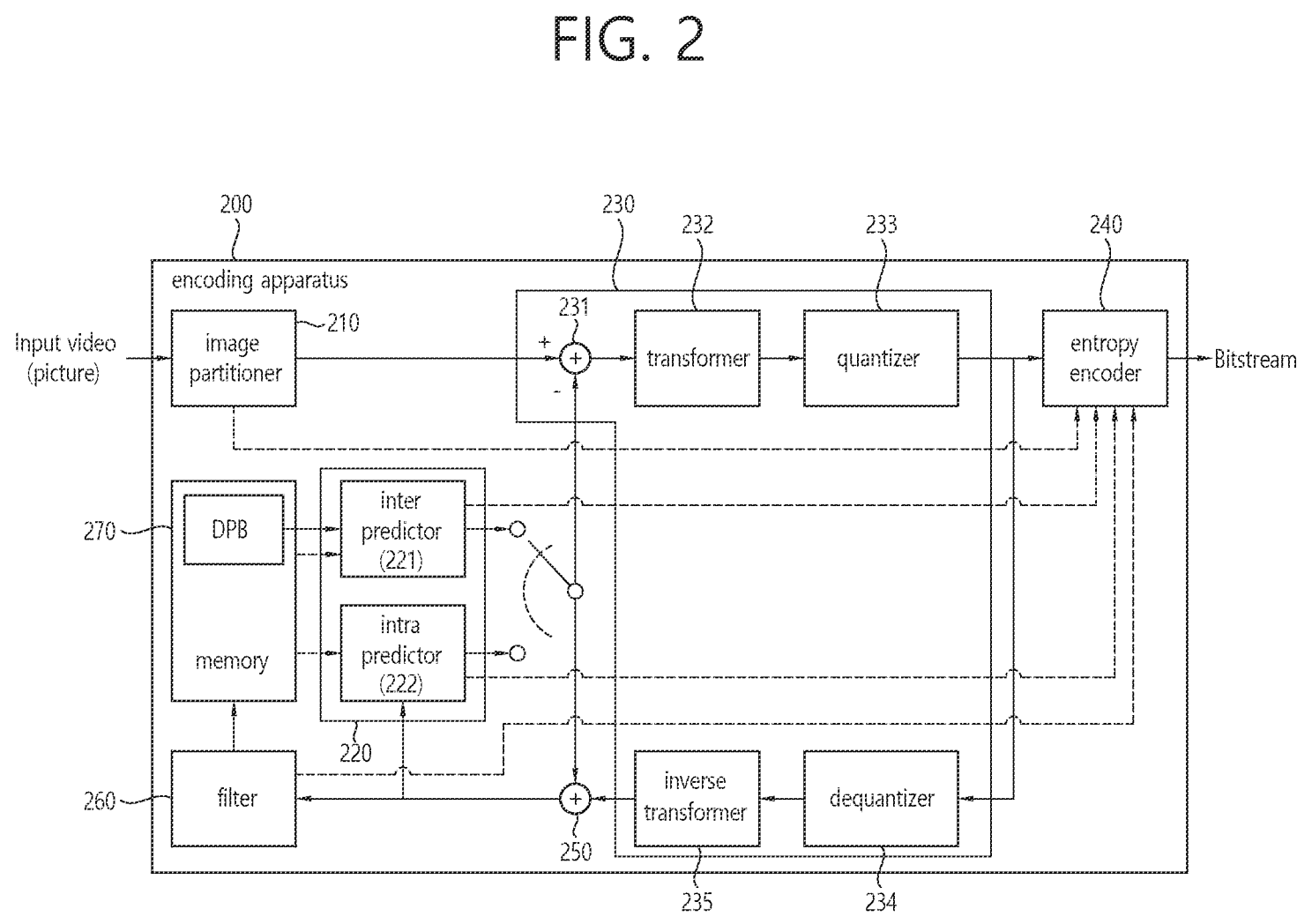

FIG. 2 is a schematic diagram illustrating a configuration of a video/image encoding apparatus to which the embodiment(s) of the present disclosure may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. An encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to the present disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information representing which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In the present disclosure, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown)

storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus 300 may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
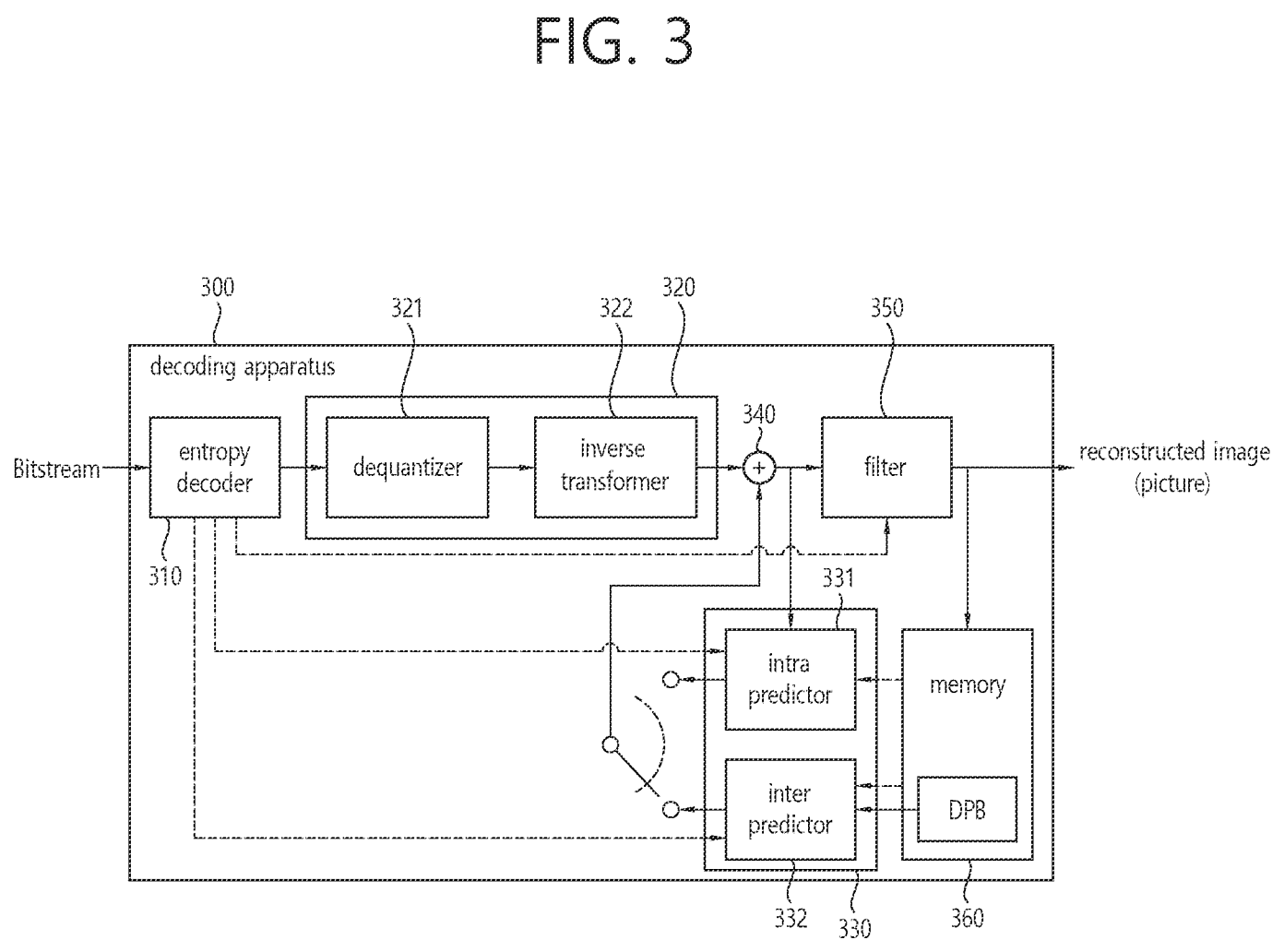

FIG. 3 is a schematic diagram illustrating a configuration of a video/image decoding apparatus to which the embodiment(s) of the present disclosure may be applied.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350 may be configured by a hardware component (ex. A decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present disclosure may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to the present disclosure may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information representing a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

Additionally, the encoding device and the decoding device can perform sign prediction on residual coefficients. For example, the encoding device and the decoding device can predict signs for a limited number of residual coefficients per block. Here, the block may be CU or TU, and the residual coefficient may be called a transform coefficient.

For example, when n signs are predicted in the current block, the encoding apparatus and decoding apparatus can calculate costs for $2^n$ sign combination hypotheses, among the sign combination hypotheses, the sign combination hypothesis with the smallest cost can be predicted using the n signs.

Meanwhile, for example, the encoding apparatus can determine signs to be predicted among signs of residual coefficients in the current block, and predict the determined signs. The encoding apparatus may determine signs to be predicted according to RDO decision making among the signs of the residual coefficients of the current block.

In general, since the sign error of transform coefficients with large values has a relatively high impact on the reconstructed block, the signs of transform coefficients with large values can be relatively easy to predict. A sorting based approach may be applied to determine the signs to be predicted based on the above-described logic. For example, one way to sort the transform coefficients of a transform block may be based on the absolute value of the transform coefficient level. However, since two quantizers are used in video/image coding standards such as the VVC standard and ECM-2.0, the transform coefficient level may not accurately reflect quantization. Therefore, optimal performance cannot be obtained by sorting by transform coefficient level.

Figure 4:
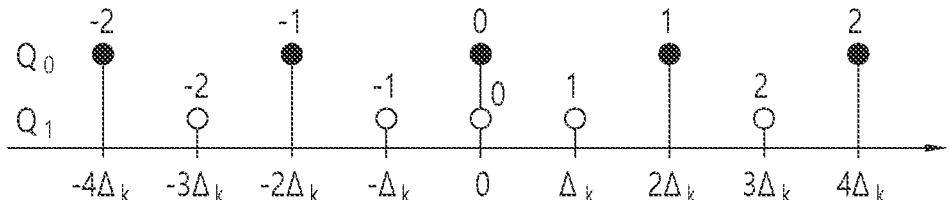
FIG. 4 illustrates quantization in quantizers of a video/image coding standard.

FIG. 4 illustrates quantization in quantizers of a video/image coding standard. The horizontal axis of FIG. 4 represents dequantized transform coefficients, and the vertical axis represents levels of dequantized transform coefficients. Referring to FIG. 4, for the same level value, the dequantized transform coefficient may be different due to two quantizers ($Q_0$ and $Q_1$ in FIG. 4) as shown below.

Case 1: Level=2, quantizer $Q_0$. Dequantized transform coefficient=$4\Delta_k$

Case 2: Level=2, quantizer $Q_1$. Dequantized transform coefficient=$3\Delta_k$

Both of the above-mentioned cases are level 2, but the dequantized transform coefficient ($4\Delta_k$) of case 1 may be larger than the dequantized transform coefficient ($3\Delta_k$) of case 2. In the method of deriving a coefficient to be sign predicted, which will be described later based on the above-described observation, transform coefficient sorting can be performed based on the qIdx value (dequantized transform coefficient=$qIdx \times \Delta_k$).

qIdx at the transform coefficient level varies depending on the DQ status and can be calculated as follows:

$$qIdx = (abs(level) << 1) - (state \,\&\, 1) \qquad \text{[Equation 1]}$$

After the absolute values of the transform coefficient levels of the current block are decoded, the current block can be sorted based on the qIdx value. For example, the transform coefficient with the highest qIdx value may be located at the beginning of the current sorted block. The signs of the first maxNumPredSigns signs in the sorted current block can be predicted, and the remaining signs can be EP coded. That is, the transform coefficients of the current block can be sorted based on the qIdx value, and n transform coefficients can be determined as the transform coefficients to be sign predicted in the order of the qIdx value. Here, the current block may be a transform block (TB).

Afterwards, for example, if n (n<=maxNumPredSigns) signs are predicted in the current block, the encoding apparatus and the decoding apparatus can perform border reconstruction $2^n$ times corresponding to the $2^n$ sign combination hypotheses using a border-cost measure for each of the $2^n$ sign combination hypotheses. For example, if n (n<=maxNumPredSigns) signs are predicted in the current block, $2^n$ simplified border reconstructions may be performed as described below. One reconstructed may be performed per specific combination of signs for the n residual coefficients. For example, for a particular reconstructed, only the leftmost pixels and topmost pixels of the block may be regenerated with the inverse transform added to the block prediction. The first inversion (vertical inversion) is complete, but the second inversion (horizontal inversion) can be faster because it only needs to generate the leftmost pixel and topmost pixel output. Additionally, for example, the number of inversion operations performed can be reduced by using a system of 'templates'. A template can be defined as an inversely transformed block when the sign is assumed to be 1 and inversely transformed from the coordinates of the coefficient for which the sign is to be predicted. Operations using the template can be performed as follows.

1. The inverse transformation can be performed by setting one of the coefficients for which the sign will be predicted to 1 and setting the remaining coefficients to 0. That is, for the sign of n coefficients to be predicted, the kth (k is 0 to n−1) prediction coefficient can be set as 1, and the remaining coefficients can be set as 0, thereby setting it as a template. The block when all n templates are added can be defined as the first sign combination hypothesis.

2. A sign combination hypothesis in which only one sign represents a negative number can be constructed using the first sign combination hypothesis and each template. Additionally, other sign combination hypotheses can also be constructed using the already constructed sign combination hypothesis and template.

For example, when three signs are predicted, storage/restoration and template application may be as shown in the tables below. That is, the templates and sign combination hypotheses when three signs are predicted may be as shown in the tables below.

TABLE 1

| Template Name | How to Create |
|---|---|
| T001 | inv xform single +ve $1^{st}$ sign-hidden coeff |
| T010 | inv xform single +ve $2^{nd}$ sign-hidden coeff |
| T100 | inv xform single +ve $3^{rd}$ sign-hidden coeff |

TABLE 2

| Hypothesis | How to Create | Store for later reuse as |
|---|---|---|
| H000 | inv xform all coeffs add to pred | H000 |
| H001 | H000 − 2 * T001 | |
| H010 | H000 − 2 * T010 | H010 |

TABLE 2-continued

| Hypothesis | How to Create | Store for later reuse as |
|---|---|---|
| H011 | H010 − 2 * T001 | |
| H100 | H000 − 2 * T100 | H100 |
| H101 | H100 − 2 * T001 | |
| H110 | H100 − 2 * T010 | H110 |
| H111 | H110 − 2 * T001 | |

Alternatively, the sign combination hypothesis can be constructed using the Gray code method. That is, the kth sign combination hypothesis may be composed of the k−1th sign combination hypothesis and one of n templates (where k is 1 to n−1). The first sign combination hypothesis (where all signs are positive) can be constructed as the sum of all templates as described previously. For example, when four signs are predicted, storage/restoration and template application may be as shown in the tables below. That is, the templates and sign combination hypotheses when four signs are predicted may be as shown in the tables below.

TABLE 3

| idx | signCurr | TXXXX = templateBuf[0:numPredSigns-1] |
|---|---|---|
| 0 | 0000 | 0000 |
| 1 | 0001 | Previous hypothesis − 2 * T0001 |
| 2 | 0011 | Previous hypothesis − 2 * T0010 |
| 3 | 0010 | Previous hypothesis + 2 * T0001 |
| 4 | 0110 | Previous hypothesis − 2 * T0100 |
| 5 | 0111 | Previous hypothesis − 2 * T0001 |
| 6 | 0101 | Previous hypothesis + 2 * T0010 |
| 7 | 0100 | Previous hypothesis + 2 * T0001 |
| 8 | 1100 | Previous hypothesis − 2 * T1000 |
| 9 | 1101 | Previous hypothesis − 2 * T0001 |
| 10 | 1111 | Previous hypothesis − 2 * T0010 |
| 11 | 1110 | Previous hypothesis + 2 * T0001 |
| 12 | 1010 | Previous hypothesis + 2 * T0100 |
| 13 | 1011 | Previous hypothesis − 2 * T0001 |
| 14 | 1001 | Previous hypothesis + 2 * T0010 |
| 15 | 1000 | Previous hypothesis + 2 * T0001 |

Referring to Table 3, the boundary reconstructed for the next sign combination hypothesis can be started by taking the previous hypothesis, requiring only a single predicted sign to be changed to construct the desired current hypothesis. This sign change can then be approximated by doubling and addition/subtraction on the sign combination hypothesis boundary of the template corresponding to the predicted sign. Approximations disclosed in the above-mentioned tables can be used only in the sign prediction process, not in the final reconstructed process. That is, the approximate values may be reconstructed values generated for the sign prediction process rather than the reconstructed sample generation process of the current block.

The cost of the sign combination hypothesis can be calculated as follows.

There may be a cost associated with each signature combination hypothesis, corresponding to the notion of image continuity across block boundaries. That is, the cost of the sign combination hypothesis may correspond to the concept of image continuity at the block boundary for the sign combination hypothesis. By minimizing the cost, a sign prediction value can be derived.

Figure 5:
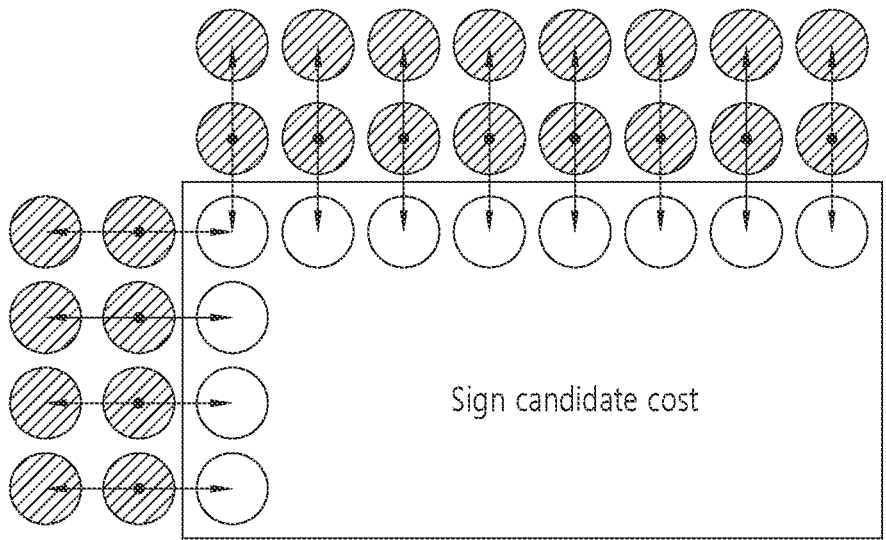
FIG. 5 exemplarily illustrates neighboring samples used to derive the cost of sign combination hypotheses.

FIG. 5 exemplarily illustrates neighboring samples used to derive the cost of sign combination hypotheses.

FIG. 5 discloses previously restored neighboring pixels and the leftmost pixels and topmost pixels of the current block for cost calculation. The neighboring pixels may include left neighboring pixels p−2,y and p−1,y, and upper neighboring pixels px,–2 and px,–1. Here, when the width and height of the current block are W and H, y may be 0 to H–1 and x may be 0 to W–1. For example, the cost can be derived as follows:

$$\text{cost} = \sum_{x=o}^{w-1} |(-R_{x,-2} + 2R_{x,-1} - P_{x,0}) - r_{x,0}| + \quad \text{[Equation 2]}$$

$$\sum_{y=o}^{h-1} |(-R_{-2,y} + 2R_{-1,y} - P_{0,y}) - r_{0,y}|$$

The cost function that derives the cost can be defined as the sum of the absolute second derivatives of the residual domain for the upper row and left column of the current block, as in the above-mentioned equation. Here, R may be the reconstructed neighboring pixel, P may be the predicted pixel of the current block, and r may be the residual hypothesis. Specifically, w may represent the width of the current block, h can represent the height of the current block, $R_{x,-2}$ may represent the upper neighboring pixel at the (x,–2) location, $R_{x,-1}$ may represent the upper neighboring pixel at the (x,–1) location, $P_{x,0}$ may represent the predicted pixel at position (x,0), $r_{x,0}$ may represent the hypothesis residual pixel at the (x,0) location, $R_{-2,y}$ can represent the left neighboring pixel at the (–2,y) position, $R_{-1,y}$ can represent the left neighboring pixel at the (–1,y) position, $P_{0,y}$ may represent the predicted pixel at (0,y) location, $r_{0,y}$ may represent the hypothesis residual pixel at the (0,y) location. Meanwhile, the $(-R_{-2}+2R_{-1}-P_0)$ term in the above-mentioned equation can be calculated only once per block, and then the cost calculation of the sign combination hypothesis can be calculated by subtracting only the residual hypothesis.

Meanwhile, sign prediction of residual coefficients can only be applied partially in the area of TU. The sign prediction area of the transform block can be performed up to 32×32 blocks. For example, the sign of the upper left M×N block of the transform block can be predicted. The values of M and N can be calculated as follows:

$$M = \min(\text{width}, 32) \quad \text{[Equation 3]}$$

$$N = \min(\text{height}, 32)$$

Here, width can represent the width of the transform block, and height can represent the height of the transform block. Additionally, sign prediction can be applied not only to coefficients after primary transformation (e.g. MTS, DCT2, etc.) but also to coefficients after LFNST mode. Additionally, to achieve a better gain/complexity trade-off, for example, up to 4 (i.e. n=4) transform coefficients for one LFNST transform block. Signs can be predicted.

For each sign to be predicted, the encoding device may search for the lowest-cost sign combination hypothesis that matches the true values of the signs already transmitted. On the other hand, for example, initially the sign residual may not be transmitted and the sign combination hypothesis with the lowest cost may simply be searched. The predicted value of the current cause of sign can be obtained from the searched cause combination hypothesis. That is, for example, the values of the n signs can be predicted by the sign combination hypothesis with the lowest cost among the sign combination hypotheses.

The sign residual may be sent as "0" if the prediction corresponds to the true value of the sign, otherwise it may be sent as "1". That is, if the value of the predicted sign is correct, a syntax element for the sign with a value of 0 can be transmitted, if the value of the predicted sign is incorrect, a syntax element for the sign with a value of 1 may be transmitted. The syntax element may also be called a sign residual.

The decoding device may parse coefficients, signs and sign residuals as part of the parsing process. The sign residuals can be parsed at the end of the TU, and then the decoding device can know the absolute values of all coefficients. Therefore, the decoding device can determine which sign is expected, based on the dequantized coefficient values for each predicted sign, the context model to be used to parse the sign prediction residual can be determined.

Additionally, knowledge of whether a prediction is "correct" or "incorrect" can simply be stored as part of the CU data of the block being parsed. The actual sign of the residual coefficient may not be known at this point.

In the reconstruct process, the decoding device may perform operations similar to the encoding device. That is, the decoding device can perform the above-described sign combination hypothesis generation and cost calculation operations for sign prediction.

For example, for n signs predicted in a TU, the decoding device can determine the costs of the sign combination hypotheses by performing boundary reconstruction $2^n$ times. Afterwards, the actual sign to be applied to the residual coefficient with the predicted sign can be determined by an exclusive-or operation of the values below.

1. The predicted value of the sign.
2. "Correct" or "incorrect" data stored in the CU by bitstream parsing.

Meanwhile, in each TU where the signs of the coefficients are "hidden" using the existing sign data hiding mechanism, sign prediction can be performed by treating the corresponding coefficients (i.e., coefficients where the sign is hidden) as "not available" in the sign prediction process and using only other coefficients.

Meanwhile, the sign prediction can be performed for n transform coefficients as described above. As mentioned, in sign prediction, the residual coefficients within the transform block are sorted from the largest to the smallest based on the quantization index (qIdx) value, and the signs of n residual coefficients can be predicted starting from the residual coefficient with the largest value. The value of n can be determined based on the maxNumPredSigns value signaled at the SPS level. The maxNumPredSigns may represent the maximum number of prediction signs that can be predicted in the sign prediction technique. The actual number of prediction signs, n, can be determined considering the number of non-zero coefficients within the sign prediction area, as shown in the equation below.

$$n = \min(numNzCoeffSPArea, maxNumPredSigns) \quad \text{[Equation 4]}$$

Here, n can represent the number of coefficients for which sign prediction is performed, numNzCoeffSPArea can represent the number of non-zero coefficients within the sign prediction area, and maxNumPredSigns can represent the maximum number of prediction signs that can be predicted in the sign prediction.

For the n coefficients, there can be $2^n$ sign combination hypotheses where each coefficient has either a positive or negative sign. The simplified boundary reconstruction described above can be performed for these $2^n$ sign combination hypotheses, and the costs of the sign combination hypotheses can be calculated. The sign combination hypothesis with the smallest cost can be determined as the optimal sign prediction value.

Here, the sign prediction area can have a fixed value, or the width (SPAreaWidth) and height (SPAreaHeight) of the sign prediction area can be derived based on factors such as intraPeriod, QP, resolution, and whether IBC mode is applied. Additionally, for example, even if the sign prediction area is derived, the actual sign prediction area may vary depending on the size of the current block, as shown in the following equation.

$$EffectiveSPAreaWidth = \min(TBWidth, SPAreaWidth) \quad \text{[Equation 5]}$$

$$EffectiveSPAreaHeight = \min(TBHeight, SPAreaHeight)$$

Here, EffectiveSPAreaWidth can represent the width of the actual sign prediction area of the transform block, TBWidth can represent the width of the transform block, and SPAreaWidth can represent the width of the sign prediction area. Similarly, EffectiveSPAreaHeight can represent the height of the actual sign prediction area of the transform block, TBHeight can represent the height of the transform block, and SPAreaHeight can represent the height of the sign prediction area.

For example, referring to Equation 5, even if the sign prediction area is set to 8×8, the actual sign prediction area of a 16×4 transform block can be derived as 8×4, with EffectiveSPAreaWidth being 8 and EffectiveSPAreaHeight being 4, according to Equation 5.

However, if sign prediction is performed with the same number of predictions for all blocks without considering the characteristics of each block, computational complexity may increase, and coding efficiency may decrease.

Accordingly, this document proposes embodiments that improve the sign prediction. For example, this document suggests an embodiment in which the number of prediction signs applied in residual coding is adaptively adjusted based on the position of the last effective coefficient within the current transform block. For instance, one embodiment proposes a method of using different numbers of prediction signs based on whether the position of the last effective coefficient within the current transform block is within a certain area. Here, for example, an arbitrary area used as the criterion for varying the number of prediction signs can have a size with an arbitrary width and an arbitrary height (ThWidth, ThHeight). In other words, an arbitrary threshold size can be used as the criterion for varying the number of prediction signs. Alternatively, for example, the actual sign prediction area (EffectiveSPAreaWidth and EffectiveSPAreaHeight) can be used as the area that serves as the criterion for varying the number of prediction signs. This document does not limit the methods for determining an arbitrary area.

Figure 6:
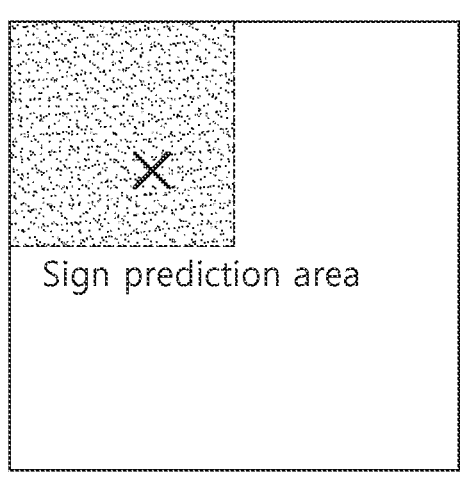
FIG. 6 illustrates an embodiment in which the number of prediction signs is derived based on the sign prediction area of an N×N transform block.
Figure 6:
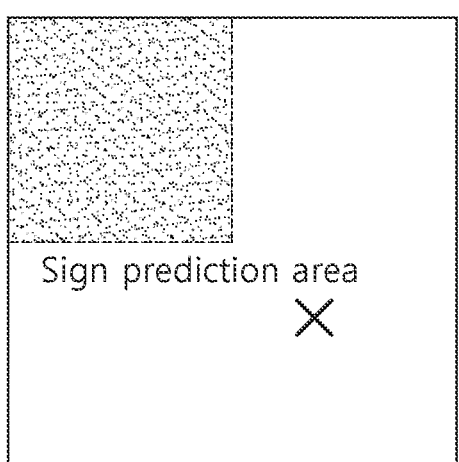

FIG. 6 illustrates an embodiment in which the number of prediction signs is derived based on the sign prediction area of an N×N transform block. For example, as shown in (a) of FIG. 6, when the last effective coefficient within the current transform block is located within the actual sign prediction area based on the (0,0) coordinate of the current transform block (i.e., when the x-coordinate of the last effective coefficient is less than EffectiveSPAreaWidth and the y-coordinate is less than EffectiveSPAreaHeight), the number of prediction signs for the current transform block can be derived as m. Conversely, as shown in (b) of FIG. 6, when the last effective coefficient is located outside the actual sign prediction area, the number of prediction signs for the current transform block can be derived as $n_2$.

Specifically, for example, when the sign prediction area is derived as 8×8, the actual sign prediction area of a 16×4 transform block can be derived as 8×4.

Figure 7:
FIG. 7 exemplarily illustrates the actual sign prediction area of a 16×4 transform block when the sign prediction area is derived as 8×8.

FIG. 7 exemplarily illustrates the actual sign prediction area of a 16×4 transform block when the sign prediction area is derived as 8×8. As shown in FIG. 7, when the actual sign prediction area is derived, if the last effective coefficient of the current transform block is located within the 8×4 actual sign prediction area, the number of prediction signs can be derived as $n_1$. If the last effective coefficient is located outside this area, the number of prediction signs can be derived as $n_2$.

Subsequently, the actual number of prediction signs can be derived by considering the number of non-zero coefficients within the actual sign prediction area of the current transform block. For example, if the number of prediction signs for the current transform block is derived as $n_1$, it can be derived as shown in the following equation.

$$n = \min(numNzCoeffSPArea, n_1) \quad \text{[Equation 6]}$$

Here, n represents the actual number of prediction signs, and numNzCoeffSPArea represents the number of non-zero coefficients within the actual sign prediction area. Referring to Equation 6, if the number of prediction signs for the current transform block is derived as $n_1$, the smaller value between $n_1$ and the number of non-zero coefficients within the actual sign prediction area will be determined as the actual number of prediction signs for the current transform block.

Additionally, for example, if the number of prediction signs for the current transform block is derived as $n_2$, it can be derived as shown in the following equation.

$$n = \min(numNzCoeffSPArea, n_2) \quad \text{[Equation 7]}$$

Here, n represents the actual number of prediction signs, and numNzCoeffSPArea represents the number of non-zero coefficients within the actual sign prediction area. Referring to Equation 7, if the number of prediction signs for the current transform block is derived as $n_2$, the smaller value between $n_2$ and the number of non-zero coefficients within the actual sign prediction area will be determined as the actual number of prediction signs for the current transform block.

Through the proposed embodiment, by using different numbers of prediction signs for transform blocks with different residual characteristics, the complexity due to sign prediction can be reduced while maintaining coding performance. Meanwhile, for example, in the case of a block where LFNST is applied, the proposed embodiment may not be used.

Additionally, in another embodiment, this document proposes an embodiment in which the number of prediction signs applied in residual coding is adaptively adjusted based on the position index of the last effective coefficient within the current transform block. For example, in one embodiment, a method is proposed to use different numbers of prediction signs based on whether the position index value of the last effective coefficient in the current transform block is within a specified threshold.

Figure 8:
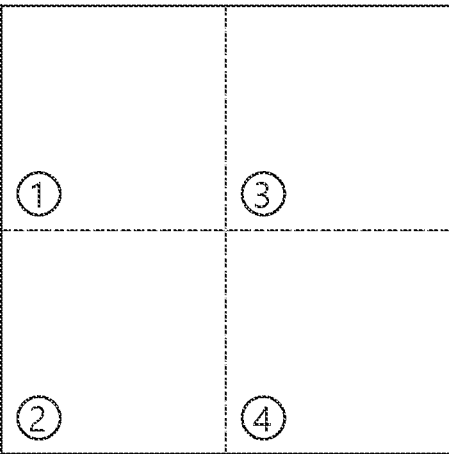
FIG. 8 exemplarily illustrates an 8×8 transform block to which a diagonal scan order is applied.

FIG. 8 exemplarily illustrates an 8×8 transform block to which a diagonal scan order is applied. For example, when a diagonal scan order is used, the transform block can be divided into coefficient groups (CG) that are scanned sequentially. For instance, referring to FIG. 8, in the case of an 8×8 transform block, the position index of the last effective coefficient can be indexed in the order of the first CG, second CG, third CG, and fourth CG of the 4×4 CGs, as shown in FIG. 8. That is, the pixel positions in the first CG can have position indices from 0 to 15 in diagonal order, the pixel positions in the second CG can have position indices from 16 to 31 in diagonal order, the pixel positions in the third CG can have position indices from 32 to 47 in diagonal order, and the pixel positions in the fourth CG can have position indices from 48 to 63 in diagonal order.

For example, if the position index of the last effective coefficient within the current transform block, based on the (0,0) coordinate, is less than a specific threshold, the number of prediction signs for the current transform block can be derived as mi. Conversely, if the position index of the last effective coefficient is equal to or greater than the specific threshold, the number of prediction signs for the current transform block can be derived as $n_2$.

Figure 9:
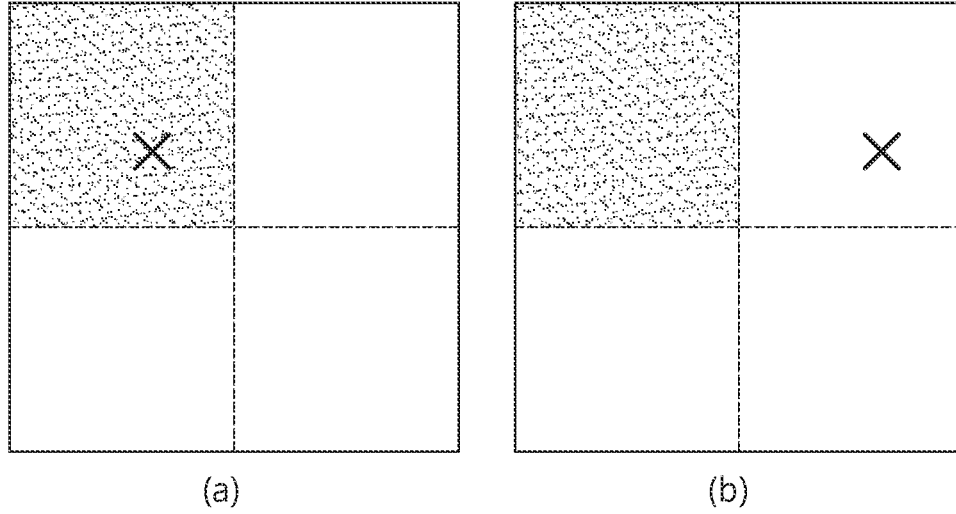
FIG. 9 illustrates an embodiment in which the number of prediction signs is derived based on the position index of the last effective coefficient in an 8×8 transform block when a specific threshold is 16.

FIG. 9 illustrates an embodiment in which the number of prediction signs is derived based on the position index of the last effective coefficient in an 8×8 transform block when a specific threshold is 16.

For example, as shown in (a) of FIG. 9, if the position index of the last effective coefficient of the current block is less than 16, meaning the position index of the last effective coefficient is between 0 and 15, the number of prediction signs for the current block can be derived as $n_1$. Conversely, as shown in (b) of FIG. 9, if the position index of the last effective coefficient is 16 or greater, meaning the position index is between 16 and 63, the number of prediction signs for the current block can be derived as $n_2$.

Figure 10:
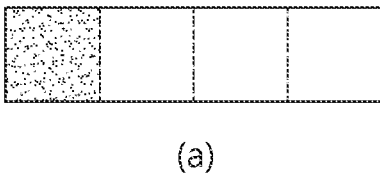
FIG. 10 illustrates an embodiment in which the number of prediction signs is derived based on the position index of the last effective coefficient in a 16×4 transform block.
Figure 10:
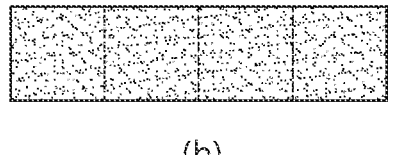

FIG. 10 illustrates an embodiment in which the number of prediction signs is derived based on the position index of the last effective coefficient in a 16×4 transform block. (a) of FIG. 10 may represent a 16×4 transform block with a specific threshold of 16, while (b) of FIG. 10 may represent a 16×4 transform block with a specific threshold of 64. As shown in (a) of FIG. 10, when the specific threshold is 16, if the position index of the last effective coefficient of the current block is less than 16, meaning the last effective coefficient is located in the first CG with a position index between 0 and 15, the number of prediction signs for the current block can be derived as $n_1$. In all other cases, the number of prediction signs for the current block can be derived as $n_2$. Furthermore, as shown in (b) of FIG. 10, when the specific threshold is 64, the number of prediction signs for the current block can be derived as $n_1$, regardless of where the last effective coefficient is located within the current block.

Figure 11:
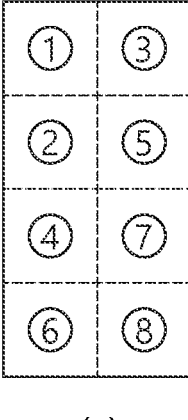
FIG. 11 illustrates an embodiment in which the number of prediction signs is derived based on the position index of the last effective coefficient in an 8×16 transform block when a specific threshold is 64.
Figure 11:
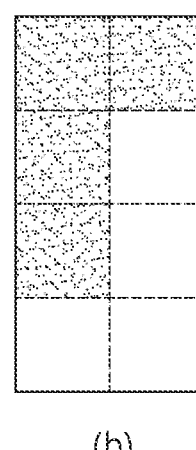

FIG. 11 illustrates an embodiment in which the number of prediction signs is derived based on the position index of the last effective coefficient in an 8×16 transform block when a specific threshold is 64.

(a) of FIG. 11 may represent an 8×16 transform block to which a diagonal scan order is applied. For example, as shown in (a) of FIG. 11, when a diagonal scan order is used, the 8×16 transform block can be divided into 4×4 coefficient groups (CG) and indexed sequentially from the first CG to the eighth CG. That is, the pixel positions in the first CG can have position indices from 0 to 15 in diagonal order, the pixel positions in the second CG can have position indices from 16 to 31 in diagonal order, the pixel positions in the third CG can have position indices from 32 to 47 in diagonal order, the pixel positions in the fourth CG can have position indices from 48 to 63 in diagonal order, the pixel positions in the fifth CG can have position indices from 64 to 79 in diagonal order, the pixel positions in the sixth CG can have position indices from 80 to 95 in diagonal order, the pixel positions in the seventh CG can have position indices from 96 to 111 in diagonal order, and the pixel positions in the eighth CG can have position indices from 112 to 127 in diagonal order.

(b) of FIG. 11 may represent an 8×16 transform block with a specific threshold of 64. As shown in (b) of FIG. 11, when the specific threshold is 64, if the position index of the last effective coefficient of the current block is less than 64, meaning it is located in one of the CGs shown in (b) of FIG. 11 with a position index between 0 and 63, the number of prediction signs for the current block can be derived as $n_1$. In all other cases, the number of prediction signs for the current block can be derived as $n_2$.

Subsequently, the actual number of prediction signs can be derived by considering the number of non-zero coefficients within the actual sign prediction area of the current transform block. For example, if the number of prediction signs for the current transform block is derived as $n_1$, it can be derived as described in Equation 6. Referring to Equation 6, if the number of prediction signs for the current transform block is derived as $n_1$, the smaller value between $n_1$ and the number of non-zero coefficients within the actual sign prediction area will be determined as the actual number of prediction signs for the current transform block.

Additionally, for example, if the number of prediction signs for the current transform block is derived as $n_2$, it can be derived as described in Equation 7. Referring to Equation 7, if the number of prediction signs for the current transform block is derived as $n_2$, the smaller value between $n_2$ and the number of non-zero coefficients within the actual sign prediction area will be determined as the actual number of prediction signs for the current transform block.

Through the proposed embodiment, by using different numbers of prediction signs for transform blocks with different residual characteristics, the complexity due to sign prediction can be reduced while maintaining coding performance. Meanwhile, for example, in the case of a block where LFNST is applied, the proposed embodiment may not be used.

Additionally, in another embodiment, this document proposes a method for signaling the number of signs used in sign prediction in the residual coding sign prediction technique. Specifically, for example, it proposes an embodiment where information representing the number of signs used for sign prediction in intra slices and information representing the number of signs used for sign prediction in inter slices are signaled separately. According to this embodiment, the information signaled in the Sequence Parameter Set (SPS) may be as shown in the following table.

TABLE 4

```
seq_parameter_set_rbsp( ) {
    (...)
        sps_num_pred_signs_intra
        sps_num_pred_signs_inter
    (...)
}
```

Table 4 illustrates an embodiment in which sps_num_pred_signs_intra and sps_num_pred_signs_inter are signaled in the SPS. The sps_num_pred_signs_intra can be a syntax element representing the maximum number of prediction signs that can be sign-predicted within a given sign prediction unit area (e.g., a transform block or a prediction area) of an intra slice when sign prediction is applied. In other words, sps_num_pred_signs_intra represents the maximum number of prediction signs that can be sign-predicted within the sign prediction unit area (e.g., a transform block or a prediction area) of an intra slice. Additionally, sps_num_pred_signs_inter can be a syntax element representing the maximum number of prediction signs that can be sign-predicted within a given sign prediction unit area (e.g., a transform block or a prediction area) of an inter slice when sign prediction is applied. In other words, sps_num_pred_signs_inter represents the maximum number of prediction signs that can be sign-predicted within the sign prediction unit area (e.g., a transform block or a prediction area) of an inter slice. For example, if there are more non-zero residual coefficients than the maximum number of prediction signs in a unit area, sign prediction can be applied only for residual coefficients as many as the maximum number of prediction signs that are signaled in a given order (e.g., a predetermined sorting order or scan order).

Additionally, for example, a method of signaling a syntax element representing whether sign prediction is enabled through SPS may be proposed. This syntax element can be referred to as a sign prediction enabled flag. For example, if a syntax element representing whether sign prediction is enabled exists in the SPS, the proposed syntax elements (sps_num_pred_signs_intra, sps_num_pred_signs_inter) may be dependent on the syntax element representing whether sign prediction is enabled. For example, according to this embodiment, the information signaled in the Sequence Parameter Set (SPS) may be as shown in the following table.

TABLE 5

```
seq_parameter_set_rbsp( ) {
    (...)
    sps_sign_prediction_enabled_flag
    if(sps_sign_prediction_enabled_flag) {
        sps_num_pred_signs_intra
        sps_num_pred_signs_inter
    }
    (...)
}
```

Referring to Table 5, the syntax element sps_sign_prediction_enabled_flag representing whether sign prediction is enabled through the SPS can be signaled. If the value of sps_sign_prediction_enabled_flag is 1, it may represent that sign prediction is enabled, and if the value of sps_sign_prediction_enabled_flag is 0, it may represent that sign prediction is not enabled. Additionally, for example, the information representing the number of signs predicted for an intra slice (e.g., sps_num_pred_signs_intra) and the information representing the number of signs predicted for an inter slice (e.g., sps_num_pred_signs_inter) may be signaled only when sps_sign_prediction_enabled_flag is 1, that is, when sign prediction is activated.

Meanwhile, for example, the proposed syntax elements can also be modified in the form of sps_num_pred_signs_intra_minusX and sps_num_pred_signs_inter_minusX. In this case, the encoding device can signal the value obtained by subtracting X from the actual maximum number of prediction signs to the syntax elements, and the decoding device can parse these syntax elements and use the value obtained by adding X to the syntax elements as the actual maximum number of prediction signs. For instance, sps_num_pred_signs_intra_minusX may represent the value obtained by subtracting X from the maximum number of prediction signs that can be sign-predicted within the sign prediction unit area (e.g., a transform block or a prediction area) of an intra slice, and sps_num_pred_signs_inter_minusX may represent the value obtained by subtracting X from the maximum number of prediction signs that can be sign-predicted within the sign prediction unit area (e.g., a transform block or a prediction area) of an inter slice. The proposed syntax elements representing the number of prediction signs can be coded using an n (e.g., 4) bit binary representation of an unsigned integer.

If the proposed embodiments are applied, instead of using a fixed number of prediction signs for all slices, it is possible to use different numbers of prediction signs depending on the characteristics of intra slices and inter slices. This can result in improved coding performance and/or reduced complexity of the sign prediction technique. Generally, since intra slices contain a larger amount of residuals compared to inter slices, it may be more efficient to differentiate the number of prediction signs between intra slices and inter slices.

Additionally, in another embodiment, this document proposes an embodiment where the information representing the number of signs predicted for a luma block and the information representing the number of signs predicted for a chroma block are signaled separately. According to this embodiment, the information signaled in the Sequence Parameter Set (SPS) may be as shown in the following table.

TABLE 6

```
seq_parameter_set_rbsp( ) {
    (...)
    sps_num_pred_signs_luma
    sps_num_pred_signs_chroma
    (...)
}
```

Table 6 illustrates an embodiment in which sps_num_pred_signs_luma and sps_num_pred_signs_chroma are signaled in the SPS. The sps_num_pred_signs_luma can be a syntax element representing the maximum number of prediction signs that can be sign-predicted within a given sign prediction unit area (e.g., a transform block or a prediction area) of a luma block when sign prediction is applied. In other words, sps_num_pred_signs_luma represents the maximum number of prediction signs that can be sign-predicted within the sign prediction unit area (e.g., a transform block or a prediction area) of a luma block. Additionally, sps_num_pred_signs_chroma can be a syntax element representing the maximum number of prediction signs that can be sign-predicted within a given sign prediction unit area (e.g., a transform block or a prediction area) of a chroma block when sign prediction is applied. In other words, sps_num_pred_signs_chroma represents the maximum number of prediction signs that can be sign-predicted within the sign prediction unit area (e.g., a transform block or a prediction area) of a chroma block. For example, if there are more non-zero residual coefficients than the maximum number of prediction signs in a unit area, sign prediction can be applied only for residual coefficients as many as the maximum number of prediction signs that are signaled in a given order (e.g., a predetermined sorting order or scan order).

Additionally, for example, a method of signaling a syntax element representing whether sign prediction is enabled through the SPS may be proposed. This syntax element can be referred to as a sign prediction enabled flag. For instance, if a syntax element representing whether sign prediction is enabled exists in the SPS, the proposed syntax elements (sps_num_pred_signs_luma, sps_num_pred_signs_chroma) may be dependent on the syntax element representing whether sign prediction is enabled. For example, according to this embodiment, the information signaled in the Sequence Parameter Set (SPS) may be as shown in the following table.

TABLE 7

```
seq_parameter_set_rbsp( ) {
    (...)
    sps_sign_prediction_enabled_flag
    if(sps_sign_prediction_enabled_flag) {
        sps_num_pred_signs_luma
        sps_num_pred_signs_chroma
    }
    (...)
}
```

Referring to Table 7, the syntax element sps_sign_prediction_enabled_flag representing whether sign prediction is enabled in the SPS can be signaled. If the value of sps_sign_prediction_enabled_flag is 1, it may represent that sign prediction is enabled, and if the value of sps_sign_prediction_enabled_flag is 0, it may represent that sign prediction is not enabled. Additionally, for example, the information representing the number of signs predicted for a luma block (e.g., sps_num_pred_signs_luma) and the information representing the number of signs predicted for a chroma block (e.g., sps_num_pred_signs_chroma) may be signaled only when sps_sign_prediction_enabled_flag is 1, that is, when sign prediction is activated.

Meanwhile, for example, the proposed syntax elements can also be modified in the form of sps_num_pred_signs_luma_minusX and sps_num_pred_signs_chroma_minusX. In this case, the encoding device can signal the value obtained by subtracting X from the actual maximum number of prediction signs to the syntax elements, and the decoding device can parse these syntax elements and use the value obtained by adding X to the syntax elements as the actual maximum number of prediction signs. For instance, sps_num_pred_signs_luma_minusX may represent the value obtained by subtracting X from the maximum number of prediction signs that can be sign-predicted within the sign prediction unit area (e.g., a transform block or a prediction area) of a luma block, and sps_num_pred_signs_chroma_minusX may represent the value obtained by subtracting X from the maximum number of prediction signs that can be sign-predicted within the sign prediction unit area (e.g., a transform block or a prediction area) of a chroma block. The proposed syntax elements representing the number of prediction signs can be coded using an n (e.g., 4) bit binary representation of an unsigned integer.

If the proposed embodiments are applied, instead of using a fixed number of prediction signs for all blocks, it is possible to use different numbers of prediction signs depending on the characteristics of luma blocks and chroma blocks. This can result in improved coding performance and/or reduced complexity of the sign prediction technique.

Additionally, in another embodiment, this document proposes a method of signaling the number of signs used in sign prediction in the sign prediction technique of residual coding in the slice header or picture header.

For example, an embodiment in which a syntax element representing the number of prediction signs is signaled in the slice header may be as shown in the following table.

TABLE 8

```
slice_header( ) {
    (...)
    sh_num_pred_signs
    (...)
}
``` sh_num_pred_signs can be a syntax element representing the maximum number of prediction signs that can be sign-predicted within a given sign prediction unit area (e.g., a transform block or a prediction area) of each slice when sign prediction is applied. In other words, sh_num_pred_signs can represent the maximum number of prediction signs that can be sign-predicted within the sign prediction unit area (e.g., a transform block or a prediction area) of a slice. For example, if there are more non-zero residual coefficients than the maximum number of prediction signs in a unit area, sign prediction can be applied only for residual coefficients as many as the maximum number of prediction signs that has been signaled in the given order (e.g., a predetermined sorting order or scan order).

Additionally, for example, a method of signaling a syntax element representing whether sign prediction is enabled through the SPS may be proposed. For instance, if a syntax element representing whether sign prediction is enabled exists in the SPS, the proposed slice header level syntax element (sh_num_pred_signs) may be dependent on the syntax element representing whether sign prediction is enabled. For example, according to this embodiment, the information signaled in the Slice Header (SH) may be as shown in the following table.

TABLE 9

```
slice_header( ) {
    (...)
    if(sps_sign_prediction_enabled_flag) {
        sh_num_pred_signs
    }
    (...)
}
```

For example, the information representing the maximum number of prediction signs that can be sign-predicted within a given sign prediction unit area (e.g., a transform block or a prediction area) of a slice (e.g., sh_num_pred_signs) may be signaled only when sps_sign_prediction_enabled_flag is 1, that is, when sign prediction is activated.

Additionally, in another embodiment, this document proposes an embodiment where the information representing the number of signs predicted for a luma block and the information representing the number of signs predicted for a chroma block are signaled separately in the slice header. According to this embodiment, the information signaled in the slice header may be as shown in the following table.

TABLE 10

```
slice_header( ) {
    (...)
        sh_num_pred_signs_luma
        sh_num_pred_signs_chroma
    (...)
}
```

Table 10 illustrates an embodiment in which sh_num_pred_signs_luma and sh_num_pred_signs_chroma are signaled in the slice header. The sh_num_pred_signs_luma can be a syntax element representing the maximum number of prediction signs that can be sign-predicted within a given sign prediction unit area (e.g., a transform block or a prediction area) of the luma blocks in the slice when sign prediction is applied. In other words, sh_num_pred_signs luma represents the maximum number of prediction signs that can be sign-predicted within the sign prediction unit area (e.g., a transform block or a prediction area) of the luma blocks in the slice. Similarly, sh_num_pred_signs_chroma can be a syntax element representing the maximum number of prediction signs that can be sign-predicted within a given sign prediction unit area (e.g., a transform block or a prediction area) of the chroma blocks in the slice when sign prediction is applied. In other words, sh_num_pred_sign s_chroma represents the maximum number of prediction signs that can be sign-predicted within the sign prediction unit area (e.g., a transform block or a prediction area) of the chroma blocks in the slice.

Additionally, for example, if a syntax element representing whether sign prediction is enabled exists in the SPS, the proposed slice header level syntax elements (sh_num_pred_signs_luma, sh_num_pred_signs_chroma) may be dependent on the syntax element representing whether sign prediction is enabled. For instance, according to this embodiment, the information signaled in the Slice Header (SH) may be as shown in the following table

TABLE 11

```
slice_header( ) {
    (...)
    if(sps_sign_prediction_enabled_flag) {
        sh_num_pred_signs_luma
        sh_num_pred_signs_chroma
    }
    (...)
}
```

For example, the information representing the maximum number of prediction signs that can be sign-predicted within a given sign prediction unit area (e.g., a transform block or a prediction area) of the luma blocks in the slice (e.g., sh_num_pred_signs_luma) and the information representing the maximum number of prediction signs that can be sign-predicted within a given sign prediction unit area (e.g., a transform block or a prediction area) of the chroma blocks in the slice (e.g., sh_num_pred_signs_chroma) may be signaled only when sps_sign_prediction_enabled_flag is 1, that is, when sign prediction is activated.

Meanwhile, for example, the proposed syntax elements can also be modified in the form of sh_num_pred_signs_luma_minusX and sh_num_pred_signs_chroma_minusX. In this case, the encoding device can signal the value obtained by subtracting X from the actual maximum number of prediction signs to the syntax elements, and the decoding device can parse these syntax elements and use the value obtained by adding X to the syntax elements as the actual maximum number of prediction signs. For instance, sh_num_pred_signs_luma_minusX may represent the value obtained by subtracting X from the maximum number of prediction signs that can be sign-predicted within the sign prediction unit area (e.g., a transform block or a prediction area) of the luma blocks in the slice, and sh_num_pred_signs_chroma_minusX may represent the value obtained by subtracting X from the maximum number of prediction signs that can be sign-predicted within the sign prediction unit area (e.g., a transform block or a prediction area) of the chroma blocks in the slice. The proposed syntax elements representing the number of prediction signs can be coded using an n (e.g., 4) bit binary representation of an unsigned integer.

If the proposed embodiments are applied, instead of using a fixed number of prediction signs throughout the entire sequence, it is possible to use different numbers of prediction signs on a slice-by-slice or picture-by-picture basis. This can lead to improved coding performance and/or reduced complexity of the sign prediction technique.

Additionally, as another embodiment, this document proposes a method of signaling a sign prediction area in a slice header or a picture header when the number of signs to be sign-predicted is signaled in a slice header or a picture header in a sign prediction technique of residual coding. For example, according to this embodiment, the information representing the sign prediction area signaled in the Slice Header (SH) may be as shown in the following table.

TABLE 12

```
slice_header( ) {
    (...)
        sh_sign_pred_area
    (...)
}
```

For example, Table 12 may illustrate the method of signaling information representing the sign prediction area at the slice header level when the maximum number of prediction signs for sign prediction is signaled at the slice header level, as proposed in this embodiment. The sh_sign_pred_area can be a syntax element representing the unit area within the transform block where sign prediction is applied. In other words, sh_sign_pred_area represents the unit area within the transform block where sign prediction is applied. For instance, if the value of sh_sign_pred_area is 4, it may represent that the 4×4 region at the top-left corner of the transform block is the sign prediction area, and if the value of sh_sign_pred_area is 8, it may represent that the 8×8 region at the top-left corner of the transform block is the sign prediction area.

Additionally, for example, if a syntax element representing whether sign prediction is enabled exists in the SPS, the proposed syntax element representing the sign prediction area (sh_sign_pred_area) may be dependent on the syntax element representing whether sign prediction is enabled. For instance, according to this embodiment, the information signaled in the Slice Header (SH) may be as shown in the following table.

TABLE 13

```
slice_header( ) {
    (...)
    if(sps_sign_prediction_enabled_flag) {
        sh_sign_pred_area
    }
    (...)
}
```

For example, the information representing the sign prediction area (e.g., sh_sign_pred_area) may be signaled only when sps_sign_prediction_enabled_flag is 1, that is, when sign prediction is activated.

Additionally, for example, an embodiment may be proposed in which the information representing the number of prediction signs and the information representing the sign prediction area are not signaled separately in the slice header. For instance, the proposed syntax element representing the sign prediction area (sh_sign_pred_area) may be dependent on the syntax element representing the number of prediction signs. According to this embodiment, the information signaled in the Slice Header (SH) may be as shown in the following table.

TABLE 14

```
slice_header( ) {
    (...)
    if(sh_num_pred_signs) {
        sh_sign_pred_area
    }
    (...)
}
```

Additionally, for example, if the information representing the number of prediction signs for a luma block and the information representing the number of prediction signs for a chroma block are signaled separately at the slice level, such as in the other embodiments described above, the proposed syntax element representing the sign prediction area may be signaled accordingly.

Meanwhile, for example, the proposed syntax element can also be modified in the form of sh_sign_pred_areaX. In this case, the encoding device can signal the value obtained by subtracting X from the actual sign prediction area value as a syntax element, and the decoding device can parse this syntax element and then use the value obtained by adding X to the syntax element's value as the actual sign prediction area value. For example, sh_sign_pred_areaX may represent the value obtained by subtracting X from the sign prediction area value within the sign prediction unit area (e.g., a transform block or prediction area) of the corresponding slice. The proposed syntax element can be encoded as an n-bit (e.g., 4) unsigned integer in a binarization format.

When the proposed embodiments are applied, instead of using a fixed number of prediction signs throughout the entire sequence, different sign prediction areas can be used based on the characteristics of the video on a slice-by-slice or picture-by-picture basis. This allows for improvements in the coding performance of the sign prediction technique and/or a reduction in complexity.

Figure 12:
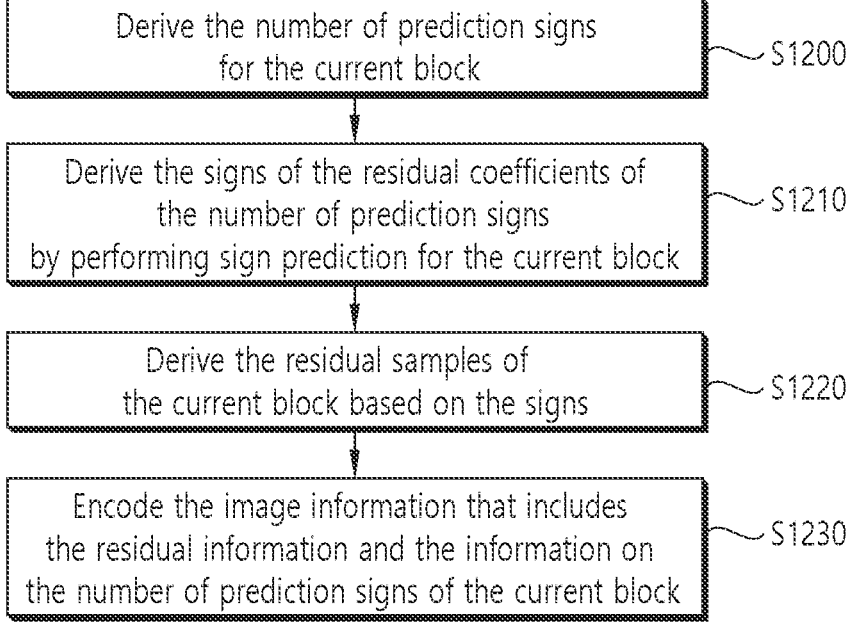
FIG. 12 schematically illustrates a video encoding method performed by an encoding device according to this document.

FIG. 12 schematically illustrates a video encoding method performed by an encoding device according to this document. The method disclosed in FIG. 12 can be performed by the encoding device disclosed in FIG. 2. Specifically, for example, steps S1200 to S1220 in FIG. 12 can be performed by the residual processing unit of the encoding device, and step S1230 can be performed by the entropy encoding unit of the encoding device. Additionally, although not shown, the process of deriving prediction samples for the current block can be performed by the prediction unit of the encoding device, and the process of generating reconstructed samples and a reconstructed picture based on the prediction samples and residual samples can be performed by the adder unit of the encoding device.

The encoding device derives the number of prediction signs for the current block (S1200). The encoding device can derive the number of signs to be sign-predicted for the current block. For example, the encoding device may derive the number of prediction signs for the current block based on information on the last effective coefficient and/or the number of prediction signs of the current block.

For example, the number of prediction signs can be derived based on whether the last effective coefficient of the current block is located in a specific area of the current block. For instance, if the last effective coefficient of the current block is located in the specific area, the number of prediction signs can be derived as a first value ($n_1$), and if the last effective coefficient is not located in the specific area, the number of prediction signs can be derived as a second value ($n_2$). For example, the specific area may be a predetermined area of a certain size. The predetermined size may be a Th×Th size. Alternatively, for example, the specific area may be an effective sign prediction area. The effective sign prediction area can represent the actual sign prediction area described above. The effective sign prediction area can be derived based on the sign prediction area and the size of the current block. For example, the sign prediction area may be an area of a predetermined size. Alternatively, for example, the sign prediction area may be an area whose size is derived based on intraPeriod, QP, resolution, and/or whether IBC mode is applied to the current block. The width of the effective sign prediction area can be derived as the smaller value between the width of the sign prediction area and the width of the current block, and the height of the effective sign prediction area can be derived as the smaller value between the height of the sign prediction area and the height of the current block. The effective sign prediction area can be derived based on the aforementioned Equation 5.

Alternatively, for example, the number of prediction signs can be derived based on whether the position index of the last effective coefficient of the current block is below a certain threshold. For instance, if the last effective coefficient of the current block is less than the specific threshold, the number of prediction signs can be derived as a first value ($n_1$), and if the last effective coefficient of the current block is equal to or greater than the specific threshold, the number of prediction signs can be derived as a second value ($n_2$). The specific threshold may be a predetermined value. For example, the specific threshold could be 16 or 64.

Alternatively, for example, the encoding device can encode information on the sign prediction number, and the number of prediction signs can be derived based on the information on the sign prediction number.

For example, the information on the sign prediction number can include information representing the sign prediction number for the transform block in an intra slice and information representing the sign prediction number for the transform block in an inter slice, and the information on the sign prediction number can be signaled through the Sequence Parameter Set (SPS). The information representing the sign prediction number for the transform block in the intra slice can represent to the aforementioned sps_num_pred_signs_intra, and the information representing the sign prediction number for the transform block in the inter slice can represent to the aforementioned sps_num_pred_signs_inter. For instance, if the current block is a transform block within an intra slice, the number of prediction signs for the current block can be derived based on the information representing the sign prediction number for the transform block in the intra slice. Alternatively, for example, if the current block is a transform block within an inter slice, the number of prediction signs for the current block can be derived based on the information representing the sign prediction number for the transform block in the inter slice.

Meanwhile, for example, the information on the sign prediction number can be signaled dependently on the sign prediction enabled flag, which represents whether sign prediction is available. For instance, the encoding device can encode a sign prediction enabled flag that represents whether sign prediction is available, and the information on the sign prediction number can be signaled based on the sign prediction enabled flag representing that sign prediction is available. The sign prediction enabled flag can be signaled through the Sequence Parameter Set (SPS). The sign prediction enabled flag can represent to the aforementioned sps_sign_prediction_enabled_flag.

Alternatively, for example, the information on the sign prediction number can include information representing the sign prediction number for the luma block and information representing the sign prediction number for the chroma block, and the information on the sign prediction number can be signaled through the Sequence Parameter Set (SPS). The information representing the sign prediction number for the luma block can represent the aforementioned sps_num_pred_signs_luma, and the information representing the sign prediction number for the chroma block can represent the aforementioned sps_num_pred_signs_chroma. For instance, if the current block is a luma block, the number of prediction signs for the current block can be derived based on the information representing the sign prediction number for the luma block. Alternatively, for example, if the current block is a chroma block, the number of prediction signs for the current block can be derived based on the information representing the sign prediction number for the chroma block.

Meanwhile, for example, the information on the sign prediction number can be signaled dependently on the sign prediction enabled flag, which represents whether sign prediction is available. For instance, the encoding device can encode a sign prediction enabled flag that represents whether sign prediction is available, and the information on the sign prediction number can be signaled based on the sign prediction enabled flag representing that sign prediction is available. The sign prediction enabled flag can be signaled through the Sequence Parameter Set (SPS). The sign prediction enabled flag can represent the aforementioned sps_sign_prediction_enabled_flag.

Alternatively, for example, the information on the sign prediction number can be signaled through the Slice Header, and the information on the sign prediction number can represent the sign prediction number for the transform block within the slice. The information on the sign prediction number can represent the aforementioned sh_num_pred_signs.

Meanwhile, for example, the information on the sign prediction number can be signaled dependently on the sign prediction enabled flag, which represents whether sign prediction is available. For instance, the encoding device can encode a sign prediction enabled flag that represents whether sign prediction is available, and the information on the sign prediction number can be signaled based on the sign prediction enabled flag representing that sign prediction is available. The sign prediction enabled flag can be signaled through the Sequence Parameter Set (SPS). The sign prediction enabled flag can represent the aforementioned sps_sign_prediction_enabled_flag.

Alternatively, for example, the information on the sign prediction number can be signaled through the Slice Header, and the information on the sign prediction number can include information representing the sign prediction number for the luma block within the slice and information representing the sign prediction number for the chroma block within the slice. The information representing the sign prediction number for the luma block can represent the aforementioned sh_num_pred_signs_luma, and the information representing the sign prediction number for the chroma block can represent the aforementioned sh_num_pred_signs_chroma. For instance, if the current block is a luma block within the current slice, the number of prediction signs for the current block within the current slice can be derived based on the information representing the sign prediction number for the luma block. Alternatively, for example, if the current block is a chroma block within the current slice, the number of prediction signs for the current block within the current slice can be derived based on the information representing the sign prediction number for the chroma block.

Meanwhile, for example, the information on the sign prediction number can be signaled dependently on the sign prediction enabled flag, which represents whether sign prediction is available. For instance, the encoding device can encode a sign prediction enabled flag that represents whether sign prediction is available, and the information on the sign prediction number can be signaled based on the sign prediction enabled flag representing that sign prediction is available. The sign prediction enabled flag can be signaled through the Sequence Parameter Set (SPS). The sign prediction enabled flag can represent the aforementioned sps_sign_prediction_enabled_flag.

Alternatively, for example, the encoding device can encode the information on the sign prediction number and the information on the sign prediction area. For instance, the sign prediction number for the current block can be derived based on the information on the sign prediction number and the information on the sign prediction area.

For example, the encoding device can encode information on the sign prediction area. The information on the sign prediction area and the information on the sign prediction number can be signaled through the Slice Header, where the information on the sign prediction area can represent the sign prediction area for the transform block within the slice, and the information on the sign prediction number can represent the sign prediction number for the transform block.

Alternatively, for example, the encoding device can encode the information on the sign prediction area, and the information on the sign prediction number can be signaled based on the value of the information on the sign prediction area.

The encoding device derives the signs of the residual coefficients of the number of prediction signs by performing sign prediction for the current block (S1210). The encoding device can predict the signs of the residual coefficients corresponding to the number of prediction signs.

For example, the encoding device can predict signs for the residual coefficients by performing the sign prediction process described above. For example, the encoding device can calculate the costs for the sign combination hypotheses of the residual coefficients and predict the sign combination hypothesis with the lowest cost as the signs of the residual coefficients. For instance, the encoding device can perform a partial inverse transformation and border reconstruction on a sign combination hypothesis to derive the hypothetical reconstructed samples of the current block. The costs for the sign combination hypothesis can be calculated based on the left neighboring samples, the top neighboring samples of the current block, and the hypothetical reconstructed samples. The cost can be derived based on the aforementioned Equation 1. Meanwhile, a sign combination hypothesis may also be referred to as a sign combination candidate.

The encoding device derives the residual samples of the current block based on the signs (S1220). The encoding device can derive the residual samples of the current block based on the signs.

The encoding device encodes the image information that includes the residual information and the information on the number of prediction signs of the current block (S1230). The encoding device can encode the residual information for the residual samples.

For example, the encoding apparatus can encode residual information of the current block including syntax elements for the predicted signs. For example, the syntax elements for the predicted signs may indicate whether the predicted signs are accurate. That is, for example, a target syntax element among the syntax elements may indicate whether the predicted sign of the transform coefficient for the target syntax element is accurate. The syntax element for the predicted sign of the transform coefficient of the current block may represent the sign residual described above. Image information may include the residual information.

Meanwhile, for example, an encoding apparatus may generate and encode prediction mode information for the current block. For example, the prediction mode information may indicate an intra prediction mode or an inter prediction mode applied to the current block. Additionally, the encoding apparatus can generate and encode prediction-related information about the motion information of the current block. The motion information may include a motion vector and a reference picture index.

Additionally, for example, an encoding apparatus may encode residual information about the residual samples. The residual information may include syntax elements for predicted signs of transform coefficients of the current block.

Additionally, for example, the encoding device can encode the sign prediction enabled flag, the information on the number of prediction signs, and/or the information on the sign prediction area.

The image information can include the prediction mode information of the current block, prediction-related information, the sign prediction enabled flag, information on the number of prediction signs, information on the sign prediction area, and/or residual information. Additionally, for example, the encoding device can encode the image information and output it in the form of a bitstream.

Meanwhile, a bitstream containing the image information may be transmitted to a decoding device through a network or (digital) storage medium. Here, the network may include a broadcasting network and/or a communication network, and the digital storage medium may include various storage media such as USB, SD, CD, DVD, Blu-ray, HDD, and SSD.

Figure 13:
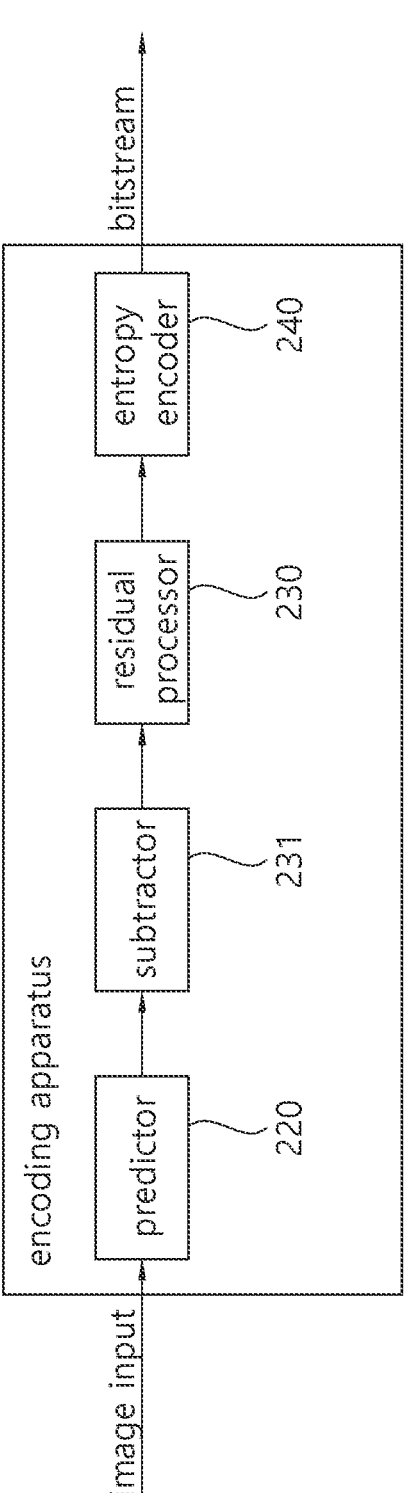
FIG. 13 schematically illustrates an encoding device that performs a video encoding method according to this document.

FIG. 13 schematically illustrates an encoding device that performs a video encoding method according to this document. The method disclosed in FIG. 12 can be performed by the encoding device shown in FIG. 13. Specifically, for example, the residual processing unit of the encoding device in FIG. 13 can perform steps S1200 to S1220, and the entropy encoding unit of the encoding device can perform step S1230. Additionally, although not shown, the process of generating the reconstructed samples and the reconstructed picture based on the residual samples and prediction samples can be performed by the adder unit of the encoding device.

34

Figure 14:
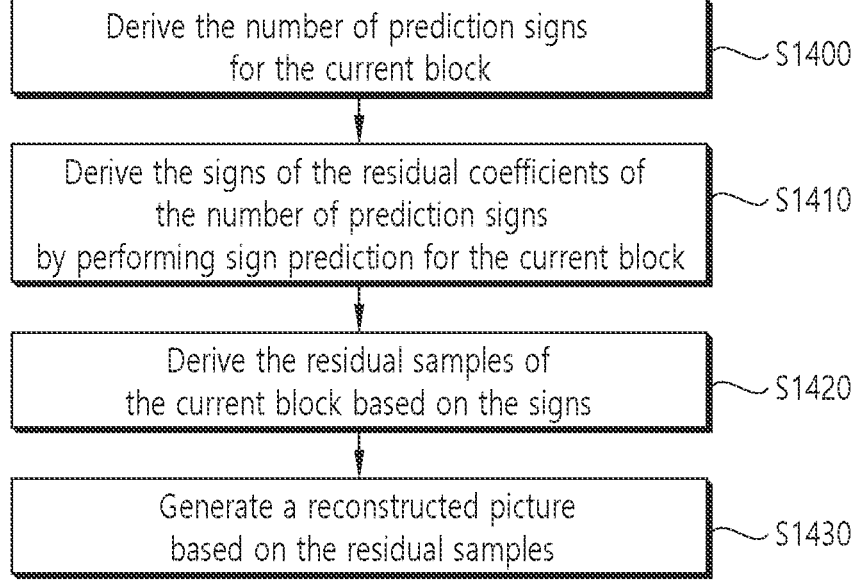
FIG. 14 schematically illustrates a video decoding method performed by a decoding device according to this document.

FIG. 14 schematically illustrates a video decoding method performed by a decoding device according to this document. The method disclosed in FIG. 14 can be performed by the decoding device shown in FIG. 3. Specifically, for example, steps S1400 to S1430 in FIG. 14 can be performed by the residual processing unit of the decoding device. Additionally, although not shown, the process of obtaining image information that includes prediction-related information and residual information for the current block through the bitstream can be performed by the entropy decoding unit of the decoding device. The process of deriving the prediction samples for the current block based on the prediction-related information can be performed by the prediction unit of the decoding device.

The decoding device derives the number of prediction signs for the current block (S1400). The decoding device can derive the number of signs to be sign-predicted for the current block. For example, the decoding device may derive the number of prediction signs for the current block based on the information on the last effective coefficient and/or the information on the number of prediction signs of the current block.

For example, the number of prediction signs can be derived based on whether the last effective coefficient of the current block is located within a specific area of the current block. If the last effective coefficient of the current block is located within the specific area, the number of prediction signs can be derived as a first value ($n_1$), and if the last effective coefficient is not located within the specific area, the number of prediction signs can be derived as a second value ($n_2$). The specific area may be a predefined area of a certain size, such as a Th×Th size. Alternatively, for example, the specific area could be an effective sign prediction area, which represents the actual sign prediction area described above. The effective sign prediction area can be derived based on the sign prediction area and the size of the current block. Alternatively, for example, the sign prediction area could be an area whose size is derived based on factors such as intraPeriod, QP, resolution, and/or whether IBC mode is applied to the current block. The width of the effective sign prediction area can be derived as the smaller value between the width of the sign prediction area and the width of the current block, and the height of the effective sign prediction area can be derived as the smaller value between the height of the sign prediction area and the height of the current block. The effective sign prediction area can be derived based on the aforementioned Equation 5.

Alternatively, for example, the number of prediction signs can be derived based on whether the position index of the last effective coefficient of the current block is less than a certain threshold. For instance, if the last effective coefficient of the current block is less than the specific threshold, the number of prediction signs can be derived as a first value ($n_1$), and if the last effective coefficient of the current block is equal to or greater than the specific threshold, the number of prediction signs can be derived as a second value ($n_2$). The specific threshold may be a predetermined value. For example, the specific threshold could be 16 or 64.

Alternatively, for example, the decoding device can obtain information on the sign prediction number through the bitstream, and the number of prediction signs can be derived based on the information on the sign prediction number.

For example, the information on the sign prediction number can include information representing the sign prediction number for the transform block in an intra slice and information representing the sign prediction number for the transform block in an inter slice. This information on the sign prediction number can be signaled through the Sequence Parameter Set (SPS). The information representing the sign prediction number for the transform block in the intra slice can represent the aforementioned sps_num_pred_signs_intra, and the information representing the sign prediction number for the transform block in the inter slice can represent the aforementioned sps_num_pred_signs_inter. For instance, if the current block is a transform block within an intra slice, the number of prediction signs for the current block can be derived based on the information representing the sign prediction number for the transform block in the intra slice. Alternatively, for example, if the current block is a transform block within an inter slice, the number of prediction signs for the current block can be derived based on the information representing the sign prediction number for the transform block in the inter slice.

Meanwhile, for example, the information on the sign prediction number can be signaled dependently on the sign prediction enabled flag, which represents whether sign prediction is available. For instance, the decoding device can obtain the sign prediction enabled flag through the bitstream, representing whether sign prediction is available, and the information on the sign prediction number can be signaled based on the sign prediction enabled flag representing that sign prediction is available. The sign prediction enabled flag can be signaled through the Sequence Parameter Set (SPS). The sign prediction enabled flag can represent the aforementioned sps_sign_prediction_enabled_flag.

Alternatively, for example, the information on the sign prediction number can include information representing the sign prediction number for the luma block and information representing the sign prediction number for the chroma block, and this information on the sign prediction number can be signaled through the Sequence Parameter Set (SPS). The information representing the sign prediction number for the luma block can represent the aforementioned sps_num_pred_signs_luma, and the information representing the sign prediction number for the chroma block can represent the aforementioned sps_num_pred_signs_chroma. For instance, if the current block is a luma block, the number of prediction signs for the current block can be derived based on the information representing the sign prediction number for the luma block. Alternatively, for example, if the current block is a chroma block, the number of prediction signs for the current block can be derived based on the information representing the sign prediction number for the chroma block.

Meanwhile, for example, the information on the sign prediction number can be signaled dependently on the sign prediction enabled flag, which represents whether sign prediction is available. For instance, the decoding device can obtain the sign prediction enabled flag through the bitstream, representing whether sign prediction is available, and the information on the sign prediction number can be signaled based on the sign prediction enabled flag representing that sign prediction is available. The sign prediction enabled flag can be signaled through the Sequence Parameter Set (SPS). The sign prediction enabled flag can represent the aforementioned sps_sign_prediction_enabled_flag.

Alternatively, for example, the information on the sign prediction number can be signaled through the Slice Header, and the information on the sign prediction number can represent the sign prediction number for the transform block within the slice. The information on the sign prediction number can represent the aforementioned sh_num_pred_signs.

Meanwhile, for example, the information on the sign prediction number can be signaled dependently on the sign prediction enabled flag, which represents whether sign prediction is available. For instance, the decoding device can obtain the sign prediction enabled flag through the bitstream, representing whether sign prediction is available, and the information on the sign prediction number can be signaled based on the sign prediction enabled flag representing that sign prediction is available. The sign prediction enabled flag can be signaled through the Sequence Parameter Set (SPS). The sign prediction enabled flag can represent the aforementioned sps_sign_prediction_enabled_flag.

Alternatively, for example, the information on the sign prediction number can be signaled through the Slice Header and can include information representing the sign prediction number for the luma block within the slice and the sign prediction number for the chroma block within the slice. The information representing the sign prediction number for the luma block can represent the aforementioned sh_num_pred_signs luma, and the information representing the sign prediction number for the chroma block can represent the aforementioned sh_num_pred_signs_chroma. For instance, if the current block is a luma block within the current slice, the number of prediction signs for the current block within the current slice can be derived based on the information representing the sign prediction number for the luma block. Alternatively, for example, if the current block is a chroma block within the current slice, the number of prediction signs for the current block within the current slice can be derived based on the information representing the sign prediction number for the chroma block.

Meanwhile, for example, the information on the sign prediction number can be signaled dependently on the sign prediction enabled flag, which represents whether sign prediction is available. For instance, the decoding device can obtain the sign prediction enabled flag through the bitstream, representing whether sign prediction is available, and the information on the sign prediction number can be signaled based on the sign prediction enabled flag representing that sign prediction is available. The sign prediction enabled flag can be signaled through the Sequence Parameter Set (SPS). The sign prediction enabled flag can represent the aforementioned sps_sign_prediction_enabled_flag.

Alternatively, for example, the decoding device can obtain the information on the sign prediction number and the information on the sign prediction area. For instance, the sign prediction number for the current block can be derived based on the information on the sign prediction number and the information on the sign prediction area.

For example, the decoding device can obtain information on the sign prediction area through the bitstream. The information on the sign prediction area and the information on the sign prediction number can be signaled through the Slice Header, where the information on the sign prediction area can represent the sign prediction area for the transform block within the slice, and the information on the sign prediction number can represent the sign prediction number for the transform block.

Alternatively, for example, the decoding device can obtain information on the sign prediction area through the bitstream, and the information on the sign prediction number can be signaled based on the value of the information on the sign prediction area.

The decoding device derives the signs of the residual coefficients of the number of prediction signs by performing sign prediction for the current block (S1410). The decoding device can predict the signs of the residual coefficients corresponding to the number of prediction signs.

For example, the decoding device can perform the aforementioned sign prediction process to predict the signs of the residual coefficients. The decoding device can calculate the costs for the sign combination hypotheses of the residual coefficients and predict the sign combination hypothesis with the lowest cost as the signs of the residual coefficients. For instance, the decoding device can perform partial inverse transformation and border reconstruction on a sign combination hypothesis to derive the hypothetical reconstructed samples of the current block for the sign combination hypothesis. The costs for the sign combination hypothesis can be calculated based on the left neighboring samples, the top neighboring samples of the current block, and the hypothetical reconstructed samples. The cost can be derived based on the aforementioned Equation 1. Meanwhile, a sign combination hypothesis may also be referred to as a sign combination candidate.

The decoding device derives the residual samples of the current block based on the signs (S1420). The decoding device can derive the residual samples of the current block based on the signs.

For example, the decoding device can determine whether the predicted signs are correct based on the syntax elements for the predicted signs, and can derive the signs of the residual coefficients based on the result of this determination. For instance, the decoding device can obtain the residual information of the current block, and this residual information may include the syntax elements for the predicted signs. For example, the syntax elements for the predicted signs can represent whether the predicted signs are correct. That is, for example, among the syntax elements, a target syntax element can represent whether the predicted sign for the target syntax element is correct. For instance, if the target syntax element represents that the predicted sign for the target syntax element is correct, the decoding device can determine that the predicted sign is correct and derive the predicted sign as the sign of the specific residual coefficient corresponding to the predicted sign. Alternatively, for instance, if the target syntax element indicates that the predicted sign for the target syntax element is incorrect, the decoding device can determine that the predicted sign is incorrect and derive the sign opposite to the predicted sign as the sign of the specific residual coefficient corresponding to the predicted sign. That is, for example, if the target syntax element represents that the predicted sign for the target syntax element is incorrect, if the predicted sign is positive, the sign of the specific residual coefficient corresponding to the predicted sign can be derived as negative, and if the predicted sign is negative, the sign of the specific residual coefficient corresponding to the predicted sign can be derived as positive. The syntax element for the predicted sign of the specific residual coefficient of the current block can represent the aforementioned sign residual.

Subsequently, for example, the decoding device can derive the absolute values of the residual coefficients based on the residual information of the current block, and based on the derived signs and the absolute values of the residual coefficients, the decoding device can derive the residual samples for the residual coefficients.

The decoding device generates a reconstructed picture based on the residual samples (S1430). For example, the decoding device can generate a reconstructed picture based on the residual samples.

Meanwhile, for example, the decoding apparatus may perform inter prediction mode or intra prediction mode for the current block based on prediction mode information obtained through a bitstream to derive prediction samples, the reconstructed picture can be generated through addition of the prediction samples and the residual samples. For example, the decoding apparatus may derive an intra prediction mode for the current block based on prediction mode information, prediction samples of the current block can be derived based on the intra prediction mode, reconstructed samples and reconstructed pictures can be generated through addition of the prediction samples and the residual samples. Or, for example, the decoding apparatus may determine that inter prediction is applied to the current block based on prediction mode information, motion information of the current block can be derived based on prediction-related information about the current block, a reference block within a reference picture can be derived based on the motion information, predicted samples of the current block can be derived based on the reference block, reconstructed samples and reconstructed pictures can be generated through addition of the prediction samples and the residual samples. As described above, in-loop filtering procedures such as deblocking filtering, SAO and/or ALF procedures can be applied to the reconstructed samples to improve subjective/objective image quality as needed.

Meanwhile, for example, the decoding device can obtain the image information of the current block through the bitstream. This image information may include information on the number of prediction signs, information on the sign prediction area, the sign prediction enabled flag, prediction mode information of the current block, and/or residual information. The residual information may include syntax elements for the predicted signs of the transform coefficients of the current block.

Figure 15:
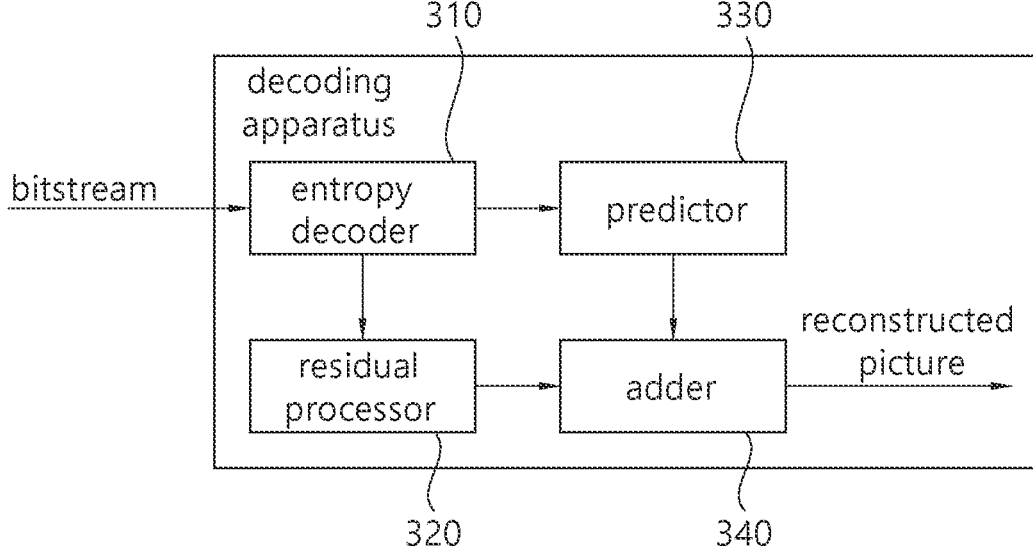
FIG. 15 schematically illustrates a decoding device that performs a video decoding method according to this document.

FIG. 15 schematically illustrates a decoding device that performs a video decoding method according to this document. The method disclosed in FIG. 14 can be performed by the decoding device disclosed in FIG. 15. Specifically, for example, the residual processing unit of the decoding device in FIG. 15 can perform S1400 to S1420 of FIG. 14, and the adder of the decoding device in FIG. 15 can perform S1430 of FIG. 14.

According to the aforementioned document, the number of predicted signs based on the last effective coefficient of the current block can be adaptively derived, thereby improving the accuracy of sign prediction by reflecting the characteristics of each block in the image, and reducing the complexity for sign prediction to enhance coding efficiency.

Additionally, according to this document, a syntax element for the number of prediction signs can be signaled separately for intra slices and inter slices, thereby improving the accuracy of sign prediction by reflecting the characteristics of the image, and reducing the complexity for sign prediction to enhance coding efficiency.

Additionally, according to this document, a syntax element for the number of prediction signs can be signaled separately for luma blocks and chroma blocks, thereby improving the accuracy of sign prediction by reflecting the characteristics of the image, and reducing the complexity for sign prediction to enhance coding efficiency.

Additionally, according to this document, a syntax element for the number of prediction signs can be signaled through the slice header or picture header, thereby improving the accuracy of sign prediction by reflecting the characteristics of each slice or picture in the image, and reducing the complexity for sign prediction to enhance coding efficiency.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The embodiments described in this specification may be performed by being implemented on a processor, a micro-processor, a controller or a chip. For example, the functional units shown in each drawing may be performed by being implemented on a computer, a processor, a microprocessor, a controller or a chip. In this case, information for imple-mentation (e.g., information on instructions) or algorithm may be stored in a digital storage medium.

In addition, the decoding apparatus and encoding appa-ratus to which the present disclosure is applied may be included in a multimedia broadcasting transmission/recep-tion apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VoD service providing apparatus, an Over the top (OTT) video apparatus, an Internet streaming service providing apparatus, a three-dimensional (3D) video apparatus, a tele-conference video apparatus, a transportation user equipment (e.g., vehicle user equipment, an airplane user equipment, a ship user equipment, etc.) and a medical video apparatus and may be used to process video signals and data signals. For example, the Over the top (OTT) video apparatus may include a game console, a blue-ray player, an internet access TV, a home theater system, a smart phone, a tablet PC, a Digital Video Recorder (DVR), and the like.

Furthermore, the processing method to which the present disclosure is applied may be produced in the form of a program that is to be executed by a computer and may be stored in a computer-readable recording medium. Multime-dia data having a data structure according to the present disclosure may also be stored in computer-readable record-ing media. The computer-readable recording media include all types of storage devices in which data readable by a computer system is stored. The computer-readable recording media may include a BD, a Universal Serial Bus (USB), ROM, PROM, EPROM, EEPROM, RAM, CD-ROM, a magnetic tape, a floppy disk, and an optical data storage device, for example. Furthermore, the computer-readable recording media includes media implemented in the form of carrier waves (e.g., transmission through the Internet).

In addition, a bit stream generated by the encoding method may be stored in a computer-readable recording medium or may be transmitted over wired/wireless commu-nication networks.

In addition, the embodiments of the present disclosure may be implemented with a computer program product according to program codes, and the program codes may be performed in a computer by the embodiments of the present disclosure. The program codes may be stored on a carrier which is readable by a computer.

Figure 16:
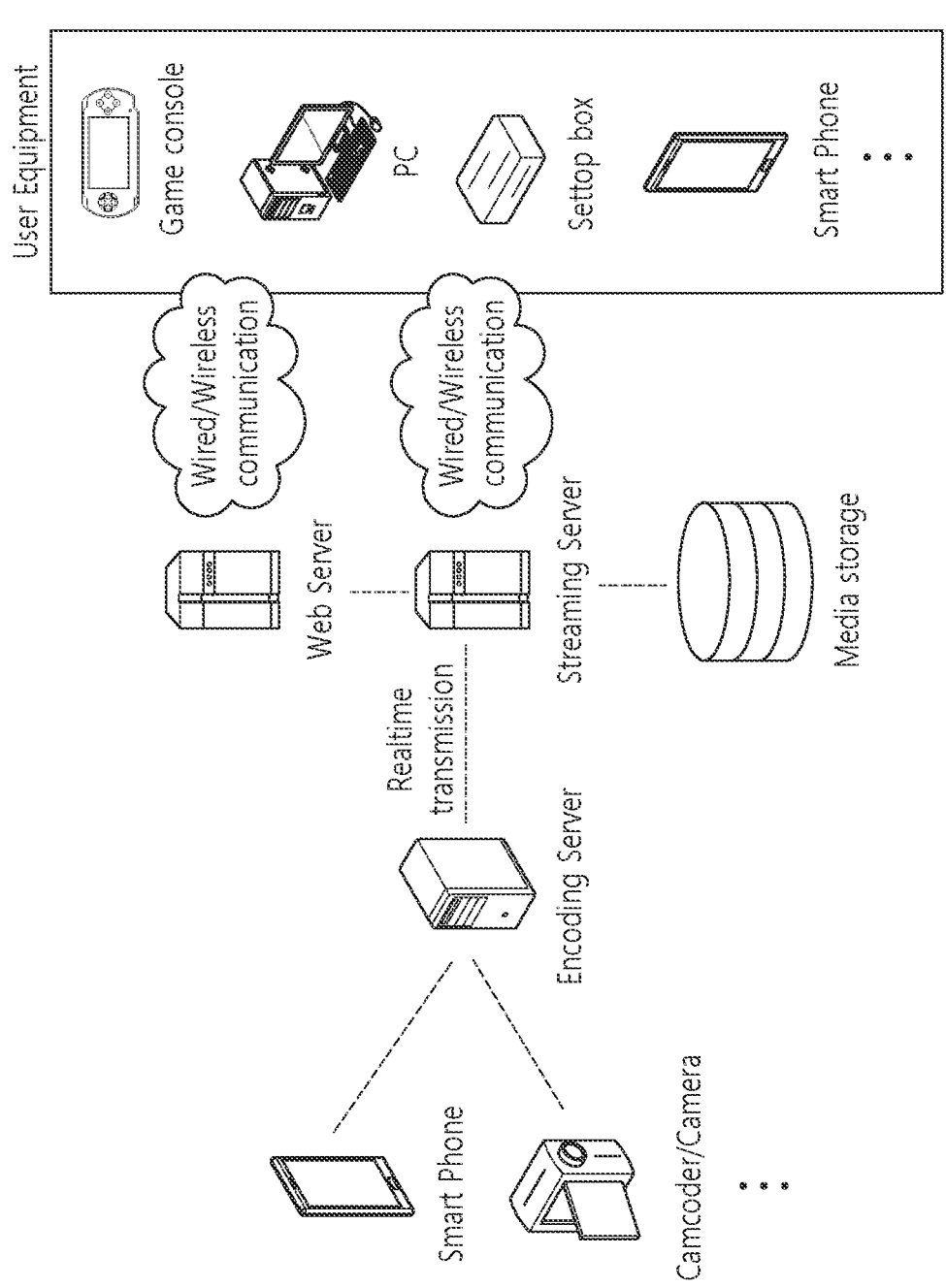
FIG. 16 exemplarily illustrates a content streaming system architecture to which the embodiments of this document are applied.

FIG. 16 exemplarily illustrates a content streaming sys-tem architecture to which the embodiments of this document are applied.

The content streaming system to which the embod-iment(s) of the present disclosure is applied may largely include an encoding server, a streaming server, a web server, a media storage, a user device, and a multimedia input device.

The encoding server compresses content input from mul-timedia input devices such as a smartphone, a camera, a camcorder, etc. Into digital data to generate a bitstream and transmit the bitstream to the streaming server. As another example, when the multimedia input devices such as smart-phones, cameras, camcorders, etc. directly generate a bit-stream, the encoding server may be omitted.

The bitstream may be generated by an encoding method or a bitstream generating method to which the embod-iment(s) of the present disclosure is applied, and the stream-ing server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. Smartwatches, smart glasses, head mounted displays), digital TVs, desktops com-puter, digital signage, and the like. Each server in the content streaming system may be operated as a distributed server, in which case data received from each server may be distrib-uted.

The claims described in the present disclosure may be combined in various ways. For example, the technical features of the method claims of the present disclosure may be combined to be implemented as an apparatus, and the technical features of the apparatus claims of the present disclosure may be combined to be implemented as a method. In addition, the technical features of the method claim of the present disclosure and the technical features of the apparatus claim may be combined to be implemented as an apparatus, and the technical features of the method claim of the present disclosure and the technical features of the apparatus claim may be combined to be implemented as a method.

What is claimed is:

1. A method for an image decoding, the method per-formed by a decoding apparatus and comprising:

deriving a number of prediction signs of a current block;

deriving signs of residual coefficients for the number of prediction signs by performing a sign prediction on the current block;

deriving residual samples of the current block based on the signs; and generating a reconstructed picture based on the residual samples, wherein the number of prediction signs is derived based on information on a position of a last effective coeffi-cient of the current block.

2. The method of claim 1, wherein the number of prediction signs is derived based on information for whether the last effective coefficient of the current block is located in a specific area of the current block.

3. The method of claim 2, wherein the specific area is an effective sign prediction area of the current block.

4. The method of claim 1, wherein the number of prediction signs is derived based on information for whether a position index of the last effective coefficient of the current block is less than a certain threshold.

5. The method of claim 1, the method further comprising:
obtaining information on a sign prediction number through a bitstream,
wherein the number of prediction signs is derived based on the information on the sign prediction number.

6. The method of claim 5, wherein the information on the sign prediction number includes information representing a sign prediction number for a transform block of an intra slice and information representing a sign prediction number for a transform block of an inter slice,
wherein the information on the sign prediction number is signaled as a Sequence Parameter Set (SPS).

7. The method of claim 6, the method further comprising:
acquiring a sign prediction enabled flag representing whether the sign prediction is available through the bitstream,
wherein the information on the sign prediction number is signaled based on the sign prediction enabled flag representing that the sign prediction is available.

8. The method of claim 5, wherein the information on the sign prediction number includes information representing a sign prediction number for a luma block and information representing a sign prediction number for a chroma block,
wherein the information on the sign prediction number is signaled as a Sequence Parameter Set (SPS).

9. The method of claim 5, wherein the information on the sign prediction number is signaled through a slice header,
wherein the information on the sign prediction number represents a sign prediction number for a transform block within a slice.

10. The method of claim 5, wherein the information on the sign prediction number is signaled through a slice header,
wherein the information on the sign prediction number includes information representing a sign prediction number for a luma block within a slice and information representing a sign prediction number for a chroma block within the slice.

11. The method of claim 5, the method further comprising:
obtaining information on a sign prediction area through the bitstream,
wherein the information on the sign prediction area and the information on the sign prediction number are signaled through a slice header,
wherein the information on the sign prediction area represents the sign prediction area for a transform block within a slice, and
wherein the information on the sign prediction number represents a sign prediction number for the transform block.

12. The method of claim 9, wherein the information on the sign prediction number is signaled based on a value of information on a sign prediction area.

13. A method for an image encoding, the method performed by an encoding apparatus and comprising:
deriving a number of prediction signs of a current block;
deriving signs of residual coefficients for the number of prediction signs by performing a sign prediction on the current block;
deriving residual samples of the current block based on the signs; and
encoding image information including residual information of the current block and information on the number of prediction signs,
wherein the number of prediction signs is derived based on information on a position of a last effective coefficient of the current block.

14. A method for transmitting data for an image, the method comprising:
obtaining a bitstream of image information including information on a number of prediction sign and residual information of a current block; and
transmitting data including the bitstream of the image information including the information on the number of prediction sign and the residual information,
wherein the number of prediction signs is derived based on information on a position of a last effective coefficient of the current block.

* * * * *